(12) United States Patent
Chandra et al.

(10) Patent No.: US 9,793,570 B2
(45) Date of Patent: Oct. 17, 2017

(54) SHARED ELECTRODE BATTERY

(71) Applicant: Microsoft Technology Licensing, LLC, Redmond, WA (US)

(72) Inventors: Ranveer Chandra, Bellevue, WA (US); Eric Horvitz, Issaquah, WA (US); Anirudh Badam, Issaquah, WA (US); Julia L. Meinershagen, Seatle, WA (US); Nissanka Arachchige Bodhi Priyantha, Redmond, WA (US); Christopher Dekmezian, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/959,265

(22) Filed: Dec. 4, 2015

(65) Prior Publication Data

US 2017/0162899 A1    Jun. 8, 2017

(51) Int. Cl.
*H01M 10/38* (2006.01)
*H01M 6/42* (2006.01)
(Continued)

(52) U.S. Cl.
CPC ......... *H01M 10/02* (2013.01); *H01M 6/5005* (2013.01); *H01M 10/0445* (2013.01);
(Continued)

(58) Field of Classification Search
CPC ............. H01M 10/637; H01M 10/282; H01M 2004/029; H01M 2004/8694; H01M 2010/4271; H01M 10/687
See application file for complete search history.

(56) References Cited

U.S. PATENT DOCUMENTS 4,145,669 A    3/1979   Babcock et al.
5,091,819 A    2/1992   Christensen et al.
(Continued)

FOREIGN PATENT DOCUMENTS

CN    101714629    5/2010
CN    101834320    9/2010
CN    102230953    11/2011
CN    202424488    9/2012
(Continued)

OTHER PUBLICATIONS

"Advanced Configuration and Power Interface", Retrieved from <http://www.acpi.info/> on Nov. 3, 2014, Jul. 23, 2014, 2 pages.
(Continued)

*Primary Examiner* — Patrick Ryan
*Assistant Examiner* — Julian Anthony

(57) ABSTRACT

A shared electrode battery includes multiple electrodes of one type (e.g., two or more cathodes) that share an electrode of another type (e.g., a shared anode). The multiple electrodes of the same type (e.g., the multiple cathodes) can have different characteristics, such as different chemistries, particle sizes and distributions, capacities, and so forth that are designed to provide particular features such as high energy density, high power density, high cycle life, fast charge, safety, and so forth. Multiple cathode-anode pairings of one of the multiple electrodes of the same type with the shared electrode are possible. Switching hardware is operable to select one of the multiple pairings at any given time, allowing the battery to provide power using the cathode having the desired characteristics at that given time. A single battery is thus able to provide these multiple different features.

20 Claims, 9 Drawing Sheets

(51) Int. Cl.

| | | |
|---|---|---|
| *H01M 10/18* | (2006.01) | |
| *H01M 6/48* | (2006.01) | |
| *H01M 4/13* | (2010.01) | |
| *H01M 10/02* | (2006.01) | |
| *H01M 10/42* | (2006.01) | |
| *H01M 10/04* | (2006.01) | |
| *H01M 6/50* | (2006.01) | |
| *H01M 10/052* | (2010.01) | |
| *H01M 10/058* | (2010.01) | |

(52) U.S. Cl.
CPC ........ *H01M 10/425* (2013.01); *H01M 10/052* (2013.01); *H01M 10/058* (2013.01); *H01M 2010/4271* (2013.01); *H01M 2220/30* (2013.01)

(56) References Cited

U.S. PATENT DOCUMENTS

| | | | |
|---|---|---|---|
| 5,315,228 A | 5/1994 | Hess et al. | |
| 5,519,261 A | 5/1996 | Stewart | |
| 5,543,245 A | 8/1996 | Andrieu et al. | |
| 5,614,332 A | 3/1997 | Pavelle et al. | |
| 5,684,404 A | 11/1997 | Millar | |
| 5,691,742 A | 11/1997 | O'Connor et al. | |
| 5,705,929 A | 1/1998 | Caravello et al. | |
| 5,764,032 A | 6/1998 | Moore | |
| 5,818,200 A | 10/1998 | Cummings et al. | |
| 5,894,212 A | 4/1999 | Balogh | |
| 5,914,585 A | 6/1999 | Grabon | |
| 5,963,010 A | 10/1999 | Hayashi et al. | |
| 6,139,987 A | 10/2000 | Koo et al. | |
| 6,154,012 A | 11/2000 | Drori | |
| 6,252,511 B1 | 6/2001 | Mondshine et al. | |
| 6,258,473 B1 * | 7/2001 | Spillman ............... H01M 6/103 |
| | | | 429/123 |
| 6,268,711 B1 | 7/2001 | Bearfield | |
| 6,299,998 B1 | 10/2001 | Morris et al. | |
| 6,346,794 B1 | 2/2002 | Odaohhara | |
| 6,353,304 B1 | 3/2002 | Atcitty et al. | |
| 6,417,646 B1 | 7/2002 | Huykman et al. | |
| 6,463,495 B1 | 10/2002 | Angelo et al. | |
| 6,650,089 B1 | 11/2003 | Freeman et al. | |
| 6,710,578 B1 | 3/2004 | Sklovsky | |
| 6,771,044 B1 | 8/2004 | Vinciguerra et al. | |
| 6,833,792 B1 | 12/2004 | Smith et al. | |
| 6,847,191 B1 | 1/2005 | Wang | |
| 6,920,404 B2 | 7/2005 | Yamanaka | |
| RE38,918 E | 12/2005 | Svensson et al. | |
| 6,977,479 B2 | 12/2005 | Hsu | |
| 6,992,580 B2 | 1/2006 | Kotzin et al. | |
| 7,015,596 B2 | 3/2006 | Pail | |
| 7,020,500 B2 | 3/2006 | Saghbini | |
| 7,059,769 B1 | 6/2006 | Potega | |
| 7,193,334 B2 | 3/2007 | Hiramitsu et al. | |
| 7,333,998 B2 | 2/2008 | Heckerman et al. | |
| 7,339,348 B2 | 3/2008 | Bui et al. | |
| 7,339,353 B1 | 3/2008 | Masias et al. | |
| 7,383,451 B2 | 6/2008 | Matsushima et al. | |
| 7,415,623 B2 | 8/2008 | Rapps et al. | |
| 7,430,675 B2 | 9/2008 | Lee | |
| 7,430,679 B2 | 9/2008 | Tevanian, Jr. | |
| 7,475,267 B1 | 1/2009 | Cocosel | |
| 7,531,989 B2 | 5/2009 | Maireanu | |
| 7,574,661 B2 | 8/2009 | Matsuura et al. | |
| 7,583,951 B2 | 9/2009 | Gibbs | |
| 7,684,942 B2 | 3/2010 | Yun et al. | |
| 7,716,500 B2 | 5/2010 | Esliger | |
| 7,734,317 B2 | 6/2010 | Patel et al. | |
| 7,787,405 B2 | 8/2010 | Dettinger et al. | |
| 7,814,348 B2 | 10/2010 | Krajcovic et al. | |
| 7,839,121 B2 | 11/2010 | Kim | |
| 7,944,662 B2 | 5/2011 | Carkner et al. | |
| 8,001,400 B2 | 8/2011 | Fadell | |
| 8,001,407 B2 | 8/2011 | Malone et al. | |
| 8,032,317 B2 | 10/2011 | Houston et al. | |
| 8,063,606 B2 | 11/2011 | Veselic | |
| 8,097,355 B2 | 1/2012 | Larsen | |
| 8,138,726 B2 | 3/2012 | Partin et al. | |
| 8,255,716 B2 | 8/2012 | Mandyam | |
| 8,258,748 B2 | 9/2012 | Constien et al. | |
| 8,313,864 B2 | 11/2012 | Christensen et al. | |
| 8,330,419 B2 | 12/2012 | Kim et al. | |
| 8,369,904 B2 | 2/2013 | Bennis et al. | |
| 8,386,816 B2 | 2/2013 | Elsilä et al. | |
| 8,386,826 B2 | 2/2013 | Newman | |
| 8,405,332 B1 | 3/2013 | Krishnamoorthy et al. | |
| 8,423,306 B2 | 4/2013 | Duncan et al. | |
| 8,427,106 B2 | 4/2013 | Kim et al. | |
| 8,456,136 B2 | 6/2013 | Kim et al. | |
| 8,471,521 B2 | 6/2013 | Stewart et al. | |
| 8,482,254 B2 | 7/2013 | Ho | |
| 8,487,473 B2 | 7/2013 | Peterson et al. | |
| 8,508,191 B2 | 8/2013 | Kim et al. | |
| 8,538,686 B2 | 9/2013 | Gruen et al. | |
| 8,594,648 B2 | 11/2013 | Musial et al. | |
| 8,598,838 B2 | 12/2013 | Cunico | |
| 8,598,849 B2 | 12/2013 | Bhardwaj et al. | |
| 8,607,036 B2 | 12/2013 | More et al. | |
| 8,624,560 B2 | 1/2014 | Ungar et al. | |
| 8,629,652 B2 | 1/2014 | Partovi et al. | |
| 8,648,493 B2 | 2/2014 | Park | |
| 8,648,567 B2 | 2/2014 | Hoffman | |
| 8,665,214 B2 | 3/2014 | Forutanpour et al. | |
| 8,686,693 B2 | 4/2014 | Bhowmik et al. | |
| 8,732,487 B2 | 5/2014 | Goraczko et al. | |
| 8,749,193 B1 | 6/2014 | Sullivan | |
| 8,751,845 B2 | 6/2014 | Assad et al. | |
| 8,768,567 B2 | 7/2014 | Diab | |
| 8,795,875 B2 | 8/2014 | Lee et al. | |
| 8,803,479 B2 | 8/2014 | Kim | |
| 8,805,764 B1 | 8/2014 | Rhines et al. | |
| 8,829,847 B2 | 9/2014 | Eaton et al. | |
| 8,833,667 B2 | 9/2014 | Ahn et al. | |
| 8,847,551 B2 | 9/2014 | Coe et al. | |
| 8,898,485 B2 | 11/2014 | Scott et al. | |
| 8,922,329 B2 | 12/2014 | Davis et al. | |
| 8,949,629 B2 | 2/2015 | Chakra et al. | |
| 8,958,854 B1 | 2/2015 | Morley et al. | |
| 8,962,188 B2 | 2/2015 | Zhamu et al. | |
| 9,285,851 B2 | 3/2016 | Hodges et al. | |
| 9,475,398 B2 | 10/2016 | Borhan et al. | |
| 9,696,782 B2 | 7/2017 | Chandra et al. | |
| 2001/0010456 A1 | 8/2001 | Kaite et al. | |
| 2001/0013767 A1 | 8/2001 | Takemoto | |
| 2001/0044332 A1 | 11/2001 | Yamada et al. | |
| 2002/0155327 A1 | 10/2002 | Faris | |
| 2003/0117143 A1 | 6/2003 | Okada | |
| 2003/0149904 A1 | 8/2003 | Kim | |
| 2004/0003300 A1 | 1/2004 | Malueg et al. | |
| 2004/0095096 A1 | 5/2004 | Melton et al. | |
| 2004/0101744 A1 | 5/2004 | Suzuki | |
| 2004/0204183 A1 | 10/2004 | Lencevicius | |
| 2005/0189949 A1 | 9/2005 | Shimizu et al. | |
| 2005/0258686 A1 | 11/2005 | Hiramitsu et al. | |
| 2006/0066285 A1 | 3/2006 | Minamiura | |
| 2006/0087291 A1 | 4/2006 | Yamauchi | |
| 2006/0176017 A1 | 8/2006 | Waguespack | |
| 2006/0284618 A1 | 12/2006 | Cho, II et al. | |
| 2007/0007823 A1 | 1/2007 | Huang et al. | |
| 2007/0050647 A1 | 3/2007 | Conroy | |
| 2007/0103114 A1 | 5/2007 | Hoffman | |
| 2007/0252552 A1 | 11/2007 | Walrath | |
| 2008/0024007 A1 | 1/2008 | Budampati et al. | |
| 2008/0075367 A1 | 3/2008 | Winn et al. | |
| 2008/0082851 A1 | 4/2008 | Zettler | |
| 2008/0137989 A1 | 6/2008 | Ng et al. | |
| 2008/0176608 A1 | 7/2008 | Budampati et al. | |
| 2008/0201587 A1 | 8/2008 | Lee | |
| 2008/0218125 A1 | 9/2008 | Bansal et al. | |
| 2008/0234956 A1 | 9/2008 | Mizuno et al. | |
| 2008/0263375 A1 | 10/2008 | Sundstrom et al. | |
| 2009/0006878 A1 | 1/2009 | Borghetti et al. | |

(56) References Cited

U.S. PATENT DOCUMENTS

| | | |
|---|---|---|
| 2009/0007128 A1 | 1/2009 | Borghetti et al. |
| 2009/0016765 A1 | 1/2009 | Honda |
| 2009/0018785 A1 | 1/2009 | Huseth et al. |
| 2009/0085553 A1 | 4/2009 | Kumar et al. |
| 2009/0295397 A1 | 12/2009 | Barsukov |
| 2010/0070334 A1 | 3/2010 | Monteverde |
| 2010/0106994 A1 | 4/2010 | Challener et al. |
| 2010/0121587 A1 | 5/2010 | Vian et al. |
| 2010/0121588 A1 | 5/2010 | Elder et al. |
| 2010/0123436 A1 | 5/2010 | Herrod et al. |
| 2010/0164430 A1 | 7/2010 | Lu et al. |
| 2010/0174928 A1 | 7/2010 | Borghetti et al. |
| 2010/0201320 A1 | 8/2010 | Coe et al. |
| 2010/0213897 A1 | 8/2010 | Tse |
| 2010/0235007 A1 | 9/2010 | Constein et al. |
| 2010/0304207 A1* | 12/2010 | Krammer .............. H02J 7/0016 429/162 |
| 2010/0332876 A1 | 12/2010 | Fields et al. |
| 2011/0016333 A1 | 1/2011 | Scott et al. |
| 2011/0018679 A1 | 1/2011 | Davis et al. |
| 2011/0025258 A1 | 2/2011 | Kim et al. |
| 2011/0025259 A1 | 2/2011 | Toya et al. |
| 2011/0057617 A1 | 3/2011 | Finberg et al. |
| 2011/0115830 A1 | 5/2011 | Lee et al. |
| 2011/0161690 A1 | 6/2011 | Lin et al. |
| 2011/0171502 A1 | 7/2011 | Kottenstette et al. |
| 2011/0181242 A1 | 7/2011 | Lee |
| 2011/0187309 A1 | 8/2011 | Chan et al. |
| 2011/0234166 A1 | 9/2011 | Liu |
| 2011/0250512 A1 | 10/2011 | Friesen et al. |
| 2011/0260686 A1 | 10/2011 | Ford |
| 2011/0264899 A1 | 10/2011 | Evans et al. |
| 2011/0309838 A1 | 12/2011 | Lin |
| 2012/0004875 A1 | 1/2012 | Maeda et al. |
| 2012/0040210 A1 | 2/2012 | Hermann |
| 2012/0046892 A1 | 2/2012 | Fink |
| 2012/0058805 A1 | 3/2012 | Yoo |
| 2012/0074893 A1 | 3/2012 | Cole |
| 2012/0098705 A1 | 4/2012 | Yost et al. |
| 2012/0102407 A1 | 4/2012 | Benario |
| 2012/0102504 A1 | 4/2012 | Iyer |
| 2012/0109519 A1 | 5/2012 | Uyeki |
| 2012/0119705 A1 | 5/2012 | Eberhard et al. |
| 2012/0119746 A1 | 5/2012 | Macris |
| 2012/0144215 A1 | 6/2012 | Naffziger et al. |
| 2012/0144221 A1 | 6/2012 | Naffziger et al. |
| 2012/0150247 A1 | 6/2012 | Meier et al. |
| 2012/0153899 A1 | 6/2012 | Marschalkowski et al. |
| 2012/0188714 A1 | 7/2012 | Von Borck et al. |
| 2012/0309455 A1 | 12/2012 | Klose et al. |
| 2012/0319652 A1 | 12/2012 | Namou et al. |
| 2012/0324578 A1 | 12/2012 | Seinfeld et al. |
| 2013/0009604 A1 | 1/2013 | Bhardwaj et al. |
| 2013/0038274 A1 | 2/2013 | Forsythe |
| 2013/0043827 A1 | 2/2013 | Weinstein et al. |
| 2013/0106357 A1 | 5/2013 | Girard et al. |
| 2013/0143100 A1 | 6/2013 | Bennis et al. |
| 2013/0162430 A1 | 6/2013 | Scherzer et al. |
| 2013/0181511 A1 | 7/2013 | Stewart et al. |
| 2013/0191625 A1 | 7/2013 | Mullens et al. |
| 2013/0191662 A1 | 7/2013 | Ingrassia, Jr. et al. |
| 2013/0221926 A1 | 8/2013 | Furtner |
| 2013/0226486 A1 | 8/2013 | Henderson et al. |
| 2013/0257377 A1 | 10/2013 | Diamond et al. |
| 2013/0262899 A1 | 10/2013 | Frantz et al. |
| 2013/0275794 A1 | 10/2013 | Annavaram et al. |
| 2013/0325379 A1 | 12/2013 | Nakamura |
| 2013/0346001 A1 | 12/2013 | Park et al. |
| 2013/0346762 A1 | 12/2013 | Hodges et al. |
| 2014/0015488 A1 | 1/2014 | Despesse |
| 2014/0021887 A1 | 1/2014 | Keily et al. |
| 2014/0038054 A1 | 2/2014 | Tojigamori et al. |
| 2014/0043010 A1 | 2/2014 | Salem |
| 2014/0062388 A1 | 3/2014 | Kim |
| 2014/0082384 A1 | 3/2014 | De Cesare et al. |
| 2014/0093779 A1 | 4/2014 | Myung et al. |
| 2014/0095003 A1 | 4/2014 | Phillips et al. |
| 2014/0125344 A1 | 5/2014 | Knight et al. |
| 2014/0155100 A1 | 6/2014 | Baldasare et al. |
| 2014/0162112 A1 | 6/2014 | Ugaji et al. |
| 2014/0181551 A1 | 6/2014 | Rahal-Arabi et al. |
| 2014/0186700 A1 | 7/2014 | Bae et al. |
| 2014/0191693 A1 | 7/2014 | Funaba et al. |
| 2014/0203780 A1 | 7/2014 | Hu et al. |
| 2014/0253023 A1 | 9/2014 | Paryani |
| 2014/0265604 A1 | 9/2014 | Mergener |
| 2014/0266061 A1 | 9/2014 | Wachal |
| 2014/0312828 A1 | 10/2014 | Vo et al. |
| 2014/0375252 A1 | 12/2014 | Ford |
| 2015/0004473 A1 | 1/2015 | Lim et al. |
| 2015/0020016 A1 | 1/2015 | Hanumara et al. |
| 2015/0084602 A1 | 3/2015 | Sawyers et al. |
| 2015/0089261 A1 | 3/2015 | Segawa et al. |
| 2015/0125743 A1 | 5/2015 | Edwards et al. |
| 2015/0188188 A1 | 7/2015 | Zhang et al. |
| 2015/0194707 A1 | 7/2015 | Park |
| 2015/0309547 A1 | 10/2015 | Huang et al. |
| 2015/0329003 A1 | 11/2015 | Li et al. |
| 2015/0351037 A1 | 12/2015 | Brown et al. |
| 2016/0114696 A1 | 4/2016 | Eifert et al. |
| 2016/0231387 A1 | 8/2016 | Hodges et al. |
| 2016/0231801 A1 | 8/2016 | Chandra et al. |
| 2016/0240891 A1 | 8/2016 | Hodges et al. |
| 2016/0241048 A1 | 8/2016 | Badam et al. |
| 2016/0248125 A1 | 8/2016 | Huang et al. |
| 2016/0248266 A1 | 8/2016 | Ferrese et al. |
| 2016/0254664 A1 | 9/2016 | Huang et al. |
| 2016/0275400 A1 | 9/2016 | Hodges et al. |
| 2017/0108906 A1 | 4/2017 | Chandra et al. |
| 2017/0139459 A1 | 5/2017 | Badam et al. |
| 2017/0139465 A1 | 5/2017 | Badam |

FOREIGN PATENT DOCUMENTS

| | | |
|---|---|---|
| CN | 103226184 | 7/2013 |
| CN | 103683255 | 3/2014 |
| EP | 1798100 | 6/2007 |
| EP | 1906295 | 4/2008 |
| EP | 2296246 | 3/2011 |
| EP | 2590050 | 5/2013 |
| EP | 2682840 | 1/2014 |
| GB | 2446168 | 8/2008 |
| JP | H0410366 | 1/1992 |
| JP | H0684544 | 3/1994 |
| JP | 2009278754 | 11/2009 |
| JP | 2010067436 | 3/2010 |
| JP | 2012243463 | 12/2012 |
| KR | 20070095689 | 10/2007 |
| KR | 20090064813 | 6/2009 |
| KR | 20140140906 | 12/2014 |
| WO | WO-9401914 | 1/1994 |
| WO | WO-9933124 | 7/1999 |
| WO | WO-03021409 | 3/2003 |
| WO | WO-2007127788 | 11/2007 |
| WO | WO-2008133951 | 11/2008 |
| WO | WO-2011127251 | 10/2011 |
| WO | WO-2012109048 | 8/2012 |
| WO | WO-2012140401 | 10/2012 |
| WO | WO-2013019899 | 2/2013 |
| WO | WO-2013052678 | 4/2013 |
| WO | WO-2013060802 | 5/2013 |
| WO | WO-2013145000 | 10/2013 |
| WO | WO-2013163695 | 11/2013 |
| WO | WO-2014098037 | 6/2014 |
| WO | WO-2015029332 | 3/2015 |
| WO | WO-2015123290 | 8/2015 |
| WO | WO-2016149702 | 9/2016 |
| WO | WO-2016197109 | 12/2016 |

OTHER PUBLICATIONS

"Anker", Retrieved on: Aug. 13, 2015—Available at: http://www.ianker.com/ExternalBatteries/category-c1-s1, 9 pages.

(56) References Cited

OTHER PUBLICATIONS

"Anode active material for Lithium-ion-battery-Gramax", Retrieved from <http://www.ogc.co.jp/e/products/battery/> on Nov. 3, 2014, 2014, 2 pages.

"Anode Materials", Retrieved from <http://www.targray.com/li-ion-battery/anode-materials> on Nov. 3, 2014, Nov. 1, 2010, 2 pages.

"Arbin BT-2000 Battery Testing Equipment", Retrieved on: Aug. 13, 2015—Available at: http://www.arbin.com/products/battery, 2 pages.

"Battery and Power Subsystem Hardware Design", Retrieved From: <https://msdn.microsoft.com/en-us/library/windows/hardware/dn481323(v=vs.85).aspx> Aug. 5, 2015, Jun. 30, 2014, 4 pages.

"Battery Anodes", Retrieved on Sep. 23, 2015 Available at: http://www.emc2.cornell.edu/content/view/battery-anodes.html, 8 pages.

"Boltzmann Machines and Deep Belief Networks", Retrieved from <http://plearn.berlios.de/machine_learning/node4.html> on Jun. 22, 2009, 7 pages.

"Cell Trak", Retrieved from <http://celltraksystems.com/monitoring_parameters.html> on Nov. 4, 2014, Aug. 16, 2013, 4 pages.

"DS2782 Stand-Alone Fuel Gauge IC", Retrieved From: <http://www.maximintegrated.com/en/products/power/battery-management/DS2782.html/tb_tab0> Aug. 6, 2015, 3 pages.

"Final Office Action", U.S. Appl. No. 12/503,605, dated Sep. 20, 2012, 12 pages.

"Final Office Action", U.S. Appl. No. 13/530,130, dated Apr. 22, 2015, 7 pages.

"Ford Developers Look to Use Google Prediction API to Optimize Energy Efficiency", Retrieved from <http://corporate.ford.com/news-center/press-releases-detail/pr-ford-developers-look-to-use-google-34591> on Nov. 11, 2014, May 10, 2011, 1 page.

"Google Now", Retrieved on: Aug. 13, 2015—Available at: http://www.google.com/landing/now/, 1 page.

"Hey Siri, what's the Best Sushi Place in Town?", Retrieved on: Aug. 13, 2015—Available at: https://www.apple.com/ios/siri/, 5 pages.

"iFixit iPad Air 2 Teardown", Retrieved on: Aug. 13, 2015—Available at: https://www.ifixit.com/Teardown/iPad+Air+2+Teardown/30592, 12 pages.

"iFixit Microsoft Surface Pro 3 Teardown", Retrieved on: Aug. 13, 2015—Available at: https://www.ifixit.com/Teardown/Microsoft+Surface+Pro+3+Teardown/26595, 17 pages.

"iFixit Samsung Galaxy Note 10.1 Teardown", Retrieved on: Aug. 13, 2015—Available at: https://www.ifixit.com/Teardown/Samsung+Galaxy+Note+10.1+Teardown/10144, 13 pages.

"International Search Report and Written Opinion", Application No. PCT/US2015/026052, Jul. 23, 2015, 10 pages.

"MacBook", Retrieved on: Aug. 13, 2015—Available at: http://www.apple.com/macbook/design/, 14 pages.

"MACCOR—Model 4200", Retrieved on: Aug. 13, 2015—Available at: http://www.maccor.com/Products/Model4200.aspx, 2 pages.

"Maxim-Parametric Search Product Table", Retrieved on: Aug. 13, 2015—Available at: http://para.maximintegrated.com/en/results.mvp?fam=batt_stat295=Fuel%26nbsp%3BGauge&1379=ModelGauge, 2 pages.

"Mophie Juice Pack Helium", Retrieved on: Aug. 13, 2015—Available at: http://www.mophie.com/shop/iphone-5/juice-pack-helium-iphone-5, 7 pages.

"Non-Final Office Action", U.S. Appl. No. 12/503,605, dated Jan. 12, 2012, 11 pages.

"Non-Final Office Action", U.S. Appl. No. 12/503,605, dated Oct. 4, 2013, 14 pages.

"Non-Final Office Action", U.S. Appl. No. 13/530,130, dated Oct. 3, 2014, 8 pages.

"Notice of Allowance", U.S. Appl. No. 12/503,605, dated Jul. 23, 2014, 5 pages.

"Notice of Allowance", U.S. Appl. No. 13/530,130, dated Nov. 6, 2015, 5 pages.

"On-the-Go and Embedded Host Supplement to the USB Revision 2.0 Specification", Retrieved from <<http://www.usb.org/developers/onthego/USB_OTG_and_EH_2-0.pdf>> on Sep. 21, 2009, May 8, 2009, 79 pages.

"Qualcomm Quick Charge", Retrieved on: Aug. 13, 2015—Available at: https://www.qualcomm.com/products/snapdragon/quick-charge, 9 pages.

"Skoda Navigation", Retrieved from <https://skoda.garmin.com/skoda/site/productOverview> on Oct. 27, 2014, Jan. 23, 2014, 1 page.

"Surface Power Cover", Retrieved on: Aug. 13, 2015—Available at: http://www.microsoft.com/surface/en-us/support/hardware-and-drivers/power-cover?os=windows-10, 8 pages.

"The PASCAL Visual Object Classes Challenges 2008 (VOC2008) Results", Retrieved from <<http://pascallin.ecs.soton.ac.uk/challengesNOC/voc2008/results/index.shtml>> on Jun. 19, 2009, Jun. 22, 2009, 5 pages.

"Understanding Lithium-ion-Battery University", Retrieved on: Sep. 23, 2015 Available at: http://batteryuniversity.com/learn/article/understanding_lithium_ion, 8 pages.

Ackley,"A Learning Algorithm for Boltzmann Machines", Cognitive Science 9, pp. 147-169, 1985, 23 pages.

Albertus,"Experiments on and Modeling of Positive Electrodes with Multiple Active Materials for Lithium-Ion Batteries", In Journal of the Electrochemical Society, vol. 156, Issue 7, May 14, 2009, 1 page.

Allen,"Microfabricated Fast-Charging Energy Storage Devices", Retrieved from <http://yprize.upenn.edu/technology/fast-charging-batteries> on Nov. 3, 2014, 2014, 2 pages.

Balan,"The Case for Cyber Foraging", In Proceedings of the 10th workshop on ACM SIGOPS European Workshop, Jul. 2002, 6 pages.

Balasubramanian,"Energy Consumption in Mobile Phones: A Measurement Study and Implications for Network Applications", Proceedings of the 9th ACM SIGCOMM conference on Internet measurement conference (IMC), Retrieved at <<http://www.cs.umass.edu/-arunab/paper/tailender-imc09.pdf>>, Nov. 4, 2009, 14 Pages.

Banerjee,"Users and Batteries: Interactions and Adaptive Energy Management in Mobile Systems", In Proceedings of the 9th International Conference on Ubiquitous Computing, Sep. 2007, 18 pages.

Bashash,"Battery Health-conscious Plug-in Hybrid Electric Vehicle Grid Demand Prediction", In Proceedings of the ASME Dynamic Systems and Control Conference, Sep. 13, 2010, 9 pages.

Benini,"Battery-Driven Dynamic Power Management of Portable Systems", In Proceedings 13th International Symposium on System Synthesis, Sep. 20, 2000, 6 pages.

Benini,"Discharge Current Steering for Battery Lifetime Optimization", In Proceedings of the International Symposium on Low Power Electronics and Design, Aug. 12, 2002, pp. 118-123.

Benini,"Extending Lifetime of Portable Systems by Battery Scheduling", In Proceedings of the conference on Design, automation and test in Europe, Mar. 13, 2001, 5 pages.

Benini,"Scheduling Battery Usage in Mobile Systems", In IEEE Transactions on Very Large Scale Integration Systems, vol. 11, Issue 6, Dec. 2003, pp. 1136-1143.

Bickford,"Security versus Energy Tradeoffs in Host-Based Mobile Malware Detection", In Proceedings of 9th International Conference on Mobile Systems, Applications, and Services, Jun. 28, 2011, pp. 225-238.

Borkar,"Intel Look Inside", Available at: http://www.intel.com/content/dam/www/public/us/en/documents/presentation/advancing-moores-law-in-2014-presentation.pdf, Aug. 11, 2014, 68 pages.

Carroll,"An Analysis of Power Consumption in a Smartphone", In Proceedings of USENIX Annual Technical Conference, Jun. 23, 2010, 14 pages.

Chan,"A New Battery Model for use with Battery Energy Storage Systems and Electric Vehicles Power Systems", In IEEE Power Engineering Society Winter Meeting, vol. 1, Jan. 23, 2000, 6 pages.

Chang,"The State of Charge Estimating Methods for Battery: A Review", In Proceeding of the ISRN Applied Mathematics, May 12, 2013, 8 pages.

(56) References Cited

OTHER PUBLICATIONS

Chen,"An Accurate Electrical Battery Model Capable of Predicting Runtime and I-V Performance", In Proceeding of the IEEE Transactions on Energy Conversion, vol. 21, Issue 2, Jun. 5, 2006, 8 pages.
Chiasserini,"Energy Efficient Battery Management", In IEEE Journal on Selected Areas in Communications, vol. 19, Issue 7, Jul. 2001, pp. 1235-1245.
Chiasson,"Estimating the State of Charge of a Battery", In Proceedings of IEEE Transactions on Control Systems Technology, vol. 13, Issue 3, Apr. 25, 2005, 6 pages.
Chikkannanavara,"A Review of Blended Cathode Materials for Use in Li-Ion Batteries", In Journal of Power Sources, vol. 248, Feb. 15, 2015, 2 Pages.
Clark,"New Tech Allows Lithium Batteries to Charge Faster, and Hold Charge Longer", Available at: http://www.gizmag.com/lithium-batteries-charge-faster-hold-longer/20550/, Oct. 20, 2015, 8 pages.
Clark,"These solar-Powered Benches Charge Phones for Free", Retrieved from <http://www.wired.co.uk/news/archive/2014-07/09/soofa> on Nov. 3, 2014, Jul. 9, 2014, 4 pages.
Cosby,"Multiple battery chemistries, single device!", Retrieved From: <https://e2e.ti.com/blogs_/b/fullycharged/archive/2015/06/16/multiple-battery-chemistries-single-device> Aug. 6, 2015, Jun. 16, 2015, 3 pages.
Dong,"Self-Constructive High-Rate System Energy Modeling for Battery-Powered Mobile Systems", In Proceedings of the 9th international conference on Mobile systems, applications, and services, Jun. 28, 2011, 14 pages.
Erdinc,"A Dynamic Lithium-Ion Battery Model considering the Effects of Temperature and Capacity Fading", In Proceedings of International Conference on Clean Electrical Power, 060/Sep. 2009, pp. 383-386.
Fairley,"Software Looks at the Road Ahead to Boost Hybrid-Car Efficiency", Retrieved from <http://spectrum.ieee.org/transportation/systems/software-looks-at-the-road-ahead-to-boost-hybridcar-efficiency> on Nov. 11, 2014, Feb. 3, 2009, 1 page.
Flinn,"Energy-Aware Adaptation for Mobile Applications", In Proceedings of the Seventeenth ACM Symposium on Operating Systems Principles, Dec. 1999, pp. 48-63.
Flinn,"Managing Battery Lifetime with Energy-Aware Adaptation", In Journal of ACM Transactions on Computer Systems, vol. 22, Issue 2, May 2004, 43 pages.
Fonseca,"Quanto: Tracking Energy in Networked Embedded Systems", In Proceedings of 8th USENIX Conference on Operating Systems Design and Implementation, Dec. 8, 2008, 16 pages.
Fox,"Automatic Construction of Efficient Multiple Battery Usage Policies", In Proceedings of the Twenty-Second International Joint Conference on Artificial Intelligence, Jun. 11, 2011, 6 pages.
Freund,"Unsupervised Learning of Distributions on Binary Vectors Using Two Layer Networks", Baskin Center for Computer Engineering & Information Sciences, University of California, Santa Cruz, UCSC-CRL-94-25, Jun. 22, 1994, 41 pages.
Gao,"Dynamic Lithium-Ion Battery Model for System Simulation", In Journal of IEEE Transactions on Components and Packaging Technologies, vol. 25, No. 3, Sep. 2002, pp. 495-505.
Gonder,"Route-Based Control of Hybrid Electric Vehicles", In SAE Technical Paper, Apr. 14, 2008, 11 pages.
Gong,"Trip Based Optimal Power Management of Plug-in Hybrid Electric Vehicle with Advanced Traffic Modeling", In SAE International Journal of Engines, Apr. 14, 2008, 1 page.
Gong,"Trip Based Optimal Power Management of Plug-in Hybrid Electric Vehicles Using Gas-Kinetic Traffic Flow Model", In Proceedings of American Control Conference, Jun. 11, 2008, 6 pages.
Groiβ,"The Influence of Temperature on the Operation of Batteries and Other Electrochemical Energy Storage Systems", Retrieved from <http://www.basytec.de/Literatur/temperature/DE_2002.htm> on Nov. 3, 2014, Jan. 8, 2003, 7 pages.
Gu,"Thermal-Electrochemical Modeling of Battery Systems", In Journal of Electrochemical Society, Jan. 28, 2000, 41 pages.
Hayakawa,"Incentive Based Multi-Objective Optimization in Electric Vehicle Navigation including Battery Charging", In Proceedings of the International Federation of Automatic Control, Aug. 24, 2014, 7 pages.
He,"State-of-Charge Estimation of the Lithium-Ion Battery Using an Adaptive Extended Kalman Filter Based on an Improved Thevenin Model", In Proceedings of IEEE Transactions on Vehicular Technology, vol. 60, Issue 4, May 2011, pp. 1461-1469.
He,"Vehicle-Infrastructure Integration-Enabled Plug-in Hybrid Electric Vehicles for Optimizing Energy Consumption", In Transportation Research Board 90th Annual Meeting Compendium of Papers DVD, Jan. 23, 2011, 14 pages.
Heath,"Code Transformations for Energy Efficient Device Management", In Journal of IEEE Transactions on Computers, vol. 53, Issue 8, Aug. 2004, 37 pages.
Higgins,"Informed Mobile Prefetching", In Proceedings of the 10th international conference on Mobile systems, applications, and services, Jun. 25, 2012, pp. 155-168.
Hinton,"A Fast Learning Algorithm for Deep Belief Nets", Retrieved from <<http://www.cs.toronto.edu/-hinton/absps/fastnc.pdf>> on Jun. 19, 2009, 2006, 16 pages.
Johnson,"Temperature Dependent Battery Models for High-Power Lithium-Ion Batteries", In 17th Annual Electric Vehicle Symposium, Oct. 15, 2000, 17 pages.
Jongerden,"Lifetime Improvement by Battery Scheduling", In Proceedings of the 16th international GI/ITG conference on Measurement, Modelling, and Evaluation of Computing Systems and Dependability and Fault Tolerance, Mar. 19, 2012, 15 pages.
Jongerden,"Maximizing System Lifetime by Battery Scheduling", In Proceeding of the IEEE/IFIP International Conference on Dependable Systems & Networks, Jun. 29, 2009, 10 pages.
Katsargyri,"Optimally Controlling Hybrid Electric Vehicles using Path Forecasting", In Proceedings of American Control Conference, Jun. 10, 2009, 6 pages.
Keshav,"Energy efficient scheduling in 4G smart phones for Mobile Hotspot Application", In Proceedings: National Conference on Communications, Feb. 3, 2012, 5 Pages.
Kohli,"Robust Higher Order Potentials for Enforcing Label Consistency", Retrieved from <<http://research.microsoft.com/en-us/um/people/pkohli/papers/klt_cvpr08.pdf>> on Jun. 19, 2009, 8 pages.
Korhonen,"Predicting Mobile Device Battery Life", In Master's Thesis, Feb. 28, 2011, 62 pages.
Koushanfar,"Hybrid Heterogeneous Energy Supply Networks", In IEEE International Symposium on Circuits and Systems, May 15, 2011, 4 pages.
Krumm,"Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009, Sep. 17, 2006, 18 pages.
Krumm,"Predestination: Where Do You Want to Go Today?", In Journal of Computer, vol. 40, Issue 4, Apr. 2007, 4 pages.
Krumm,"Where Will They Turn: Predicting Turn Proportions at Intersections", In Journal of Personal and Ubiquitous Computing, vol. 14, Issue 7, Oct. 2010, 14 pages.
Kumar,"Discriminative Random Fields", International Journal of Computer Vision 68(2), 179-201, 2006, 23 pages.
Laasonen,"Adaptive On-Device Location Recognition", In Proceedings of the 2nd International Conference on Pervasive Computing, Researchers and Practitioners, Apr. 2004, pp. 287-304.
LaMarca,"Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009, May 2005, 18 pages.
Langari,"Intelligent Energy Management Agent for a Parallel Hybrid Vehicle—Part I: System Architecture and Design of the Driving Situation Identification Process", In IEEE Transactions on Vehicular Technology, vol. 54, Issue 3, May 23, 2005, 10 pages.
Larochelle,"An Empirical Evaluation of Deep Architectures on Problems with Many Factors of Variation", University of Montreal, CIAR Summer School, Aug. 9, 2007, 24 pages.

(56) References Cited

OTHER PUBLICATIONS

Lee,"Sparse Deep Belief Net Model for Visual Area V2", Computer Science Department, Stanford University, Retrieved from <<http://books.nips.cc/papers/files/nips20/NIPS20070934.pdf>> on Jun. 19, 2009, 8 pages.

Lu,"A Scalable and Programmable Architecture for the Continuous Restricted Boltzmann Machine in VLSI", The Department of Electrical Engineering, The National Tsing-Hua University, Taiwan, IEEE, 2007, pp. 1297-1300, 2007, 4 pages.

Mak,"Infrastructure Planning for Electric Vehicles with Battery Swapping", In Journal of Academic Science, vol. 59, Issue 7, Jul. 2013, 33 pages.

Man,"Towards a Hybrid Approach to SoC Estimation for a Smart Battery Management System (BMS) and Battery Supported Cyber-Physical Systems (CPS)", In Proceeding of the 2nd Baltic Congress on Future Internet Communications, Apr. 25, 2012, 4 pages.

Mandal,"IntellBatt: Towards Smarter Battery Design", In Proceedings of 45th ACM/IEEE Design Automation Conference, Jun. 8, 2008, 6 pages.

Miettinen,"Energy Efficiency of Mobile Clients in Cloud Computing", In Proceedings of the 2nd USENIX conference on Hot topics in cloud computing, Jun. 22, 2010, 7 pages.

Miliche,"A First Experimental Investigation of the Practical Efficiency of Battery Scheduling", In Proceedings of 23th International Conference on Architecture of Computing Systems,, Feb. 22, 2010, 6 pages.

MIT"Reality Commons", Retrieved from <http://realitycommons.media.mit.edu/> on Nov. 3, 2014, 2014, 2 pages.

Mittal,"Empowering Developers to Estimate App Energy Consumption", In Proceedings of the 18th annual international conference on Mobile computing and networking, Aug. 22, 2012, pp. 317-328.

Musardo,"A-ECMS: An Adaptive Algorithm for Hybrid Electric Vehicle Energy Management", In Proceedings of the 44th IEEE Conference on Decision and Control, and the European Control Conference, Dec. 12, 2005, 8 pages.

Osindero,"Modeling Image Patches with a Directed Hierarchy of Markov Random Fields", Retrieved from <<http://www.cs.toronto.edu/-hinton/absps/lateral.pdf>> on Jun. 19, 2009, 8 pages.

Panigrahi,"Battery Life Estimation of Mobile Embedded Systems", In Proceeding of the Fourteenth International Conference on VLSI Design, Jan. 2001, 7 pages.

Pathak,"Fine-Grained Power Modeling for Smartphones using System Call Tracing", In Proceedings of the sixth conference on Computer systems, Apr. 10, 2011, pp. 153-168.

Pathak,"Where is the Energy Spent Inside My App? Fine Grained Energy Accounting on Smartphones with Eprof", In Proceedings of the 7th ACM European conference on Computer Systems, Apr. 10, 2012, pp. 29-42.

Prigg,"Charged in 30 seconds: Israeli Firm Claims Battery Breakthrough that could Change the way we Power Phones and Laptops", Retrieved from <http://www.dailymail.co.uk/sciencetech/article-2599243/Charged-30-seconds-Israeli-firm-claims-battery-breakthrough-change-way-charge-phones-laptops.html> on Nov. 3, 2014, Apr. 7, 2014, 6 pages.

Qian,"Profiling Resource Usage for Mobile Applications: A Cross-layer Approach", In Proceedings of the 9th international conference on Mobile systems, applications, and services, Jun. 28, 2011, 14 pages.

Ranzato,"Sparse Feature Learning for Deep Belief Networks", Retrieved from <<http://yann.lecun.com/exdb/publis/pdf/ranzato-nips-07 .pdf>> on Jun. 19, 2009, 8 pages.

Rao,"Analysis of Discharge Techniques for Multiple Battery Systems", In Proceedings of the International Symposium on Low Power Electronics and Design, Aug. 25, 2003, pp. 44-47.

Rao,"Battery Modeling for Energy-Aware System Design", In Journal of Computer, vol. 36, Issue 12, Dec. 2012, 11 pages.

Ravi,"Context-aware Battery Management for Mobile Phones", Proceedings of the Sixth Annual IEEE International Conference on Pervasive Computing and Communications (PERCOM), Retrieved at <<http://www.cs.rutgers.edu/discolab/smartphone/papers/percom08.pdf>>, 2008, 10 Pages.

Ravi,"Context-aware Battery Management for Mobile Phones: A Feasibility Study", In Proceedings of IEEE International Conference on Pervasive Computing and Communications, 2006, 16 pages.

Richard,"Google's Prediction API Could Optimize Your Car's Fuel Efficiency", Retrieved from <http://www.treehugger.com/cars/googles-prediction-api-could-optimize-your-cars-fuel-efficiency.html> on Nov. 11, 2014, May 18, 2011, 3 pages.

Rong,"An Analytical Model for Predicting the Remaining Battery Capacity Prediction for Lithium-Ion Batteries", In Proceedings of the conference on Design, Automation and Test in Europe—vol. 1, Mar. 2003, 2 pages.

Ross,"A Systematic Approach to Learning Object Segmentation from Motion", MIT Computer Science and AI Laboratory, Retrieved from <<http://web.mit.edu/mgross/www/publications/mgrlpk-cvw-paper-03.pdf>> on Jun. 19, 2009, 8 pages.

Roth,"Fields of Experts: A Framework for Learning Image Priors", IEEE, Retrieved from <<http://ieeexplore.ieee.org/stamp/stamp.jsp?tp=&isnumber=31473&arnumber=1467533>> on Jun. 19, 2009, 8 pages.

Roy,"Energy Management in Mobile Devices with Cinder Operating System", In Proceedings of the sixth conference on Computer systems, Apr. 10, 2011, pp. 139-152.

Sachenbacher,"Modeling and Optimization for Efficient Electrical Mobility: Challenges from the E-Tour Project", In Proceedings of First International Workshop on Constraint Reasoning and Optimization for Computational Sustainability, Sep. 20, 2009, 2 pages.

Sathiyanarayanan,"Maximization Battery Lifetime and Improving Efficiency", In Proceedings of International Conference on Devices, Circuits and Systems, Mar. 15, 2012, 4 pages.

Shanklin,"Samsung Gear Live vs. Gear 2", Available at: http://www.gizmag.com/samsung-gear-live-vs-gear-2-smartwatch-comparison/32775/, Jul. 1, 2014, 17 pages.

Shotton,"Semantic Texton Forests for Image Categorization and Segmentation", IEEE, Retrieved from <<http://ieeexplore.ieee.org/stamp/stamp.jsp?tp=&arnumber=4587503&isnumber=4587335>> on Jun. 19, 2009, 2008, 8 pages.

Shotton,"TextonBoost for Image Understanding: Multi-Class Object Recognition and Segmentation by Jointly Modeling Texture, Layout, and Context", Retrieved from <<http://johnwinn.org/Publications/papers/TextonBoost_IJCV2009.pdf>> on Jun. 19, 2009, Jul. 2, 2007, 30 pages.

Shye,"Into the wild: Studying real user activity patterns to guide power optimizations for mobile architectures", In Proceedings of 42nd Annual IEEE/ACM International Symposium on Microarchitecture,, Dec. 12, 2009, pp. 168-178.

Simpson,"Characteristics of Rechargeable Batteries", In Literature No. SNVA533, 2011, 12 pages.

Smolensky,"Information Processing in Dynamical Systems: Foundations of Harmony Theory", CU-CS-321-86, University of Colorado at Boulder, Department of Computer Science, Retrieved from, Feb. 1986, 55 pages.

Srinivasan,"This week in batteries (TWiB)", Available at: http://thisweekinbatteries.blogspot.in/2010_06_01_archive.html, Jun. 28, 2015, 4 pages.

Strommer,"NFC-enabled Wireless Charging", In Proceedings of the 4th International Workshop on Near Field Communication, Mar. 13, 2012, 6 pages.

Styler,"Active Management of a Heterogeneous Energy Store for Electric Vehicles", In IEEE Forum on Integrated and Sustainable Transportation System, Jun. 29, 2011, 6 pages.

Styler,"Active Management of a Heterogeneous Energy Store for Electric Vehicles", Retrieved from: <http://repository.cmu.edu/cgi/viewcontent.cgi?article=1845&context=robotics> on Jun. 29, 2011, 8 Pages.

Thiagarajan,"Who Killed My Battery: Analyzing Mobile Browser Energy Consumption", In Proceedings of the 21st international conference on World Wide Web, Apr. 16, 2012, pp. 41-50.

(56) References Cited

OTHER PUBLICATIONS

Tieleman,"Training Restricted Boltzmann Machines Using Approximations to the Likelihood Gradient", Proceedings of the 25th International Conference on Machine Learning, pp. 1064-1071, 2008, 8 pages.
Tu,"Image Parsing: Unifying Segmentation, Detection, and Recognition", Proceedings of the Ninth IEEE International Conference on Computer Vision (ICCV 2003) 2-Volume Set, 2003, 8 pages.
Tu,"Image Segmentation by Data-Driven Markov Chain Monte Carlo", IEEE Transactions on Pattern Analysis and Machine Intelligence, vol. 24, No. 5, pp. 657-673, May 2002, 17 pages.
Viswanathan,"Effect of Entropy Change of Lithium Intercalation on Cathodes and Anodes on Li-ion Battery Thermal Management", In Journal of Power Sources, vol. 195, Issue 11, Jun. 1, 2010, pp. 3720-3729.
Wagner,"Microsoft Planning 7-Day Phone Batteries", Retrieved from <http://www.lightreading.com/mobile/devices-smartphones/microsoft-planning-7-day-phone-batteries/d/d-id/709382> on Nov. 11, 2014, Jun. 10, 2014, 4 pages.
Wang,"Reducing Power Consumption for Mobile Platforms via Adaptive Traffic Coalescing", In IEEE Journal on Selected Areas in Communications, vol. 29, Issue 8, Sep. 2011, pp. 1618-1629.
Wen,"Online prediction of Battery Lifetime for Embedded and Mobile Devices", In Proceedings of the Third International Conference on Power-Aware Computer Systems, Dec. 1, 2003, 15 pages.
Wu,"An Interleaved Dual-Battery Power Supply for Battery-Operated Electronics", In Proceedings of the Asia and South Pacific Design Automation Conference, Jan. 28, 2001, pp. 387-390.
Xu,"Optimizing Background Email Sync on Smartphones", In Proceeding of the 11th Annual International Conference on Mobile Systems, Applications, and Services, Jun. 25, 2013, pp. 55-68.
Xu,"V-edge: Fast Self-constructive Power Modeling of Smartphones Based on Battery Voltage Dynamics", In Proceedings of the 10th USENIX conference on Networked Systems Design and Implementation, Apr. 2, 2013, 24 pages.
Yoon,"App-Scope: Application Energy Metering Framework for Android Smartphones using Kernel Activity Monitoring", In Proceedings of the USENIX conference on Annual Technical Conference, Jun. 15, 2012, 14 pages.
Zeng,"ECOSystem: Managing Energy as a First Class Operating System Resource", In Proceedings of ASPLOS 2002, Available at <http://www.cs.duke.edu/~vahdat/ps/ecosystem.pdf>, Oct. 2002, 10 pages.
Zhang,"Abstract—Cooperation Behavior between Heterogeneous Cations in Hybrid Batteries", In Journal of Chemical Communications, Issue 85, Aug. 22, 2013, 4 pages.
Zhang,"Accurate Online Power Estimation and Automatic Battery Behavior Based Power Model Generation for Smartphones", In Proceedings of the eighth IEEE/ACM/IFIP international conference on Hardware/software codesign and system synthesis, Oct. 24, 2010,, Oct. 24, 2010, pp. 105-114.
Zhang,"Modeling Discharge Behavior of Multicell Battery", In Proceeding of the IEEE Transactions on Energy Conversion, vol. 25, Issue 4, Dec. 2010, pp. 1133-1141.
Zheng,"Enhancing Battery Efficiency for Pervasive Health-Monitoring Systems Based on Electronic Textiles", In Proceedings of IEEE Transactions on Information Technology in Biomedicine, vol. 14, No. 2, Nov. 3, 2009, 10 pages.
Zhu,"A Stochastic Grammar of Images", Foundations and Trends in Computer Graphics and Vision, vol. 2, No. 4, pp. 259-362, 2006, 104 pages.
"International Search Report and Written Opinion", Application No. PCT/US2016/016670, dated Sep. 14, 2016, 23 pages.
"International Search Report and Written Opinion", Application No. PCT/US2016/016669, dated Sep. 30, 2016, 24 pages.
"Non-Final Office Action", U.S. Appl. No. 14/617,719, dated Aug. 22, 2016, 9 pages.
"Non-Final Office Action", U.S. Appl. No. 14/617,751, dated Aug. 25, 2016, 10 pages.
"Non-Final Office Action", U.S. Appl. No. 14/885,858, dated Oct. 7, 2016, 18 pages.
"Second Written Opinion", Application No. PCT/US2016/015493, dated Jul. 28, 2016, 5 pages.
"Second Written Opinion", Application No. PCT/US2016/016037, dated Sep. 1, 2016, 5 pages.
"Second Written Opinion", Application No. PCT/US2015/026052, dated Mar. 29, 2016, 6 pages.
"International Preliminary Report on Patentability", Application No. PCT/US2016/016033, dated Nov. 7, 2016, 6 pages.
"International Preliminary Report on Patentability", Application No. PCT/US2015/026052, dated Jul. 27, 2016, 8 pages.
"Non-Final Office Action", U.S. Appl. No. 14/624,825, dated Nov. 18, 2016, 33 pages.
"Non-Final Office Action", U.S. Appl. No. 14/633,009, dated Dec. 1, 2016, 7 pages.
"Second Written Opinion", U.S. Appl. No. PCT/US2016/016670, dated Nov. 18, 2016, 6 pages.
"International Search Report and Written Opinion", Application No. PCT/US2016/016037, dated Apr. 8, 2016, 10 pages.
"International Search Report and Written Opinion", Application No. PCT/US2016/016033, dated May 9, 2016, 10 pages.
"International Search Report and Written Opinion", Application No. PCT/US2016/016671, dated May 11, 2016, 10 pages.
"International Search Report and Written Opinion", Application No. PCT/US2016/015493, dated Apr. 4, 2016, 11 pages.
"International Search Report and Written Opinion", Application No. PCT/US2016/016034, dated Apr. 14, 2016, 16 pages.
"Final Office Action", U.S. Appl. No. 14/617,719, dated Dec. 12, 2016, 10 pages.
"International Preliminary Report on Patentability", Application No. PCT/US2016/016037, dated Nov. 24, 2016, 6 pages.
"International Search Report and Written Opinion", Application No. PCT/US2016/055238, dated Jan. 19, 2017, 11 pages.
"Non-Final Office Action", U.S. Appl. No. 14/262,205, dated Dec. 23, 2016, 6 pages.
"Non-Final Office Action", U.S. Appl. No. 14/626,600, dated Feb. 13, 2017, 27 pages.
"Non-Final Office Action", U.S. Appl. No. 14/943,967, dated Jan. 3, 2017, 11 pages.
"Restriction Requirement", U.S. Appl. No. 14/624,808, dated Feb. 23, 2017, 6 pages.
"Second Written Opinion", Application No. PCT/US2016/016034, dated Jan. 17, 2017, 8 pages.
"Final Office Action", U.S. Appl. No. 14/617,751, dated Mar. 10, 2017, 11 pages.
"International Preliminary Report on Patentability", Application No. PCT/US2016/016671, dated Feb. 22, 2017, 6 pages.
"International Search Report and Written Opinion", Application No. PCT/US2016/063741, dated Mar. 22, 2017, 13 pages.
"International Search Report and Written Opinion", Application No. PCT/US2016/060415, dated Feb. 22, 2017, 16 pages.
"Non-Final Office Action", U.S. Appl. No. 14/626,518, dated Mar. 27, 2017, 24 pages.
"Notice of Allowance", U.S. Appl. No. 14/617,719, dated Mar. 1, 2017, 5 pages.
"Notice of Allowance", U.S. Appl. No. 14/633,009, dated Apr. 18, 2017, 7 pages.
"Corrected Notice of Allowance", U.S. Appl. No. 14/617,719, dated May 30, 2017, 2 pages.
"Corrected Notice of Allowance", U.S. Appl. No. 14/617,719, dated Jun. 8, 2017, 2 pages.
"Corrected Notice of Allowance", U.S. Appl. No. 14/633,009, dated Jun. 7, 2017, 4 pages.
"Final Office Action", U.S. Appl. No. 14/885,858, dated Jun. 9, 2017, 22 pages.
"International Preliminary Report on Patentability", Application No. PCT/US2016/015493, dated Apr. 21, 2017, 6 pages.
"International Preliminary Report on Patentability", Application No. PCT/US2016/016670, dated May 12, 2017, 7 pages.
"Non-Final Office Action", U.S. Appl. No. 14/617,751, Jun. 30, 2017, 11 pages.

(56) References Cited

OTHER PUBLICATIONS

"Non-Final Office Action", U.S. Appl. No. 14/624,808, dated May 23, 2017, 5 pages.
"Non-Final Office Action", U.S. Appl. No. 14/941,416, dated May 17, 2017, 13 pages.
"Notice of Allowance", U.S. Appl. No. 14/262,205, dated May 31, 2017, 5 pages.
"Corrected Notice of Allowance", U.S. Appl. No. 14/633,009, dated Jul. 28, 2017, 2 pages.
"Non-Final Office Action", U.S. Appl. No. 14/662,938, dated Aug. 9, 2017, 33 pages.
"International Preliminary Report on Patentability", Application No. PCT/US2016/016034, dated Aug. 4, 2017, 9 pages.

* cited by examiner

SHARED ELECTRODE BATTERY

BACKGROUND

Many devices today utilize some form of battery for various power needs, such as a primary power source, a backup power source, and so forth. Battery life is a primary concern, particularly with mobile devices such as mobile phones, portable computing devices, wearables, and so forth. Current battery designs typically provide little if any flexibility in affecting battery performance during various usage scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with one or more aspects, a system includes a battery and switching hardware. The battery includes a shared anode, a first cathode, and a second cathode. The switching hardware is operable to selectively activate one of multiple cathode-anode pairings, a first of the multiple cathode-anode pairings including the shared anode and the first cathode, and a second of the multiple cathode-anode pairings including the shared anode and the second cathode.

In accordance with one or more aspects, a system includes a battery and switching hardware. The battery includes a shared cathode, a first anode, and a second anode. The switching hardware is operable to selectively activate one of multiple cathode-anode pairings, a first of the multiple cathode-anode pairings including the shared cathode and the first anode, and a second of the multiple cathode-anode pairings including the shared cathode and the second anode.

In accordance with one or more aspects, a shared electrode battery includes a first electrode of a first type, a second electrode of the first type, and a third electrode of a second type, the third electrode comprising a shared electrode. The shared electrode battery further includes a first separator and a second separator. The first separator is between the first electrode and the third electrode to prevent mixing of electrode material of the first electrode with electrode material of the third electrode, but to allow ions to flow between the first electrode and the third electrode in response to activation of a cathode-anode pairing including the first electrode and the third electrode. The second separator is between the second electrode and the third electrode to prevent mixing of electrode material of the second electrode with electrode material of the third electrode, but to allow ions to flow between the second electrode and the third electrode in response to activation of a cathode-anode pairing including the second electrode and the third electrode.

In accordance with one or more aspects, a method includes analyzing one or more factors regarding a computing device that includes a shared electrode battery to establish a switching policy for the shared electrode battery, the shared electrode battery including a shared anode, a first cathode, and a second cathode. The method further includes selecting one of multiple cathode-anode pairings for the shared electrode battery to activate at a particular time based on the switching policy and causing at least one switch of a circuit to be closed to activate the selected cathode-anode pairing of the shared electrode battery, a first of the multiple cathode-anode pairings including the shared anode and the first cathode, and a second of the multiple cathode-anode pairings including the shared anode and the second cathode.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
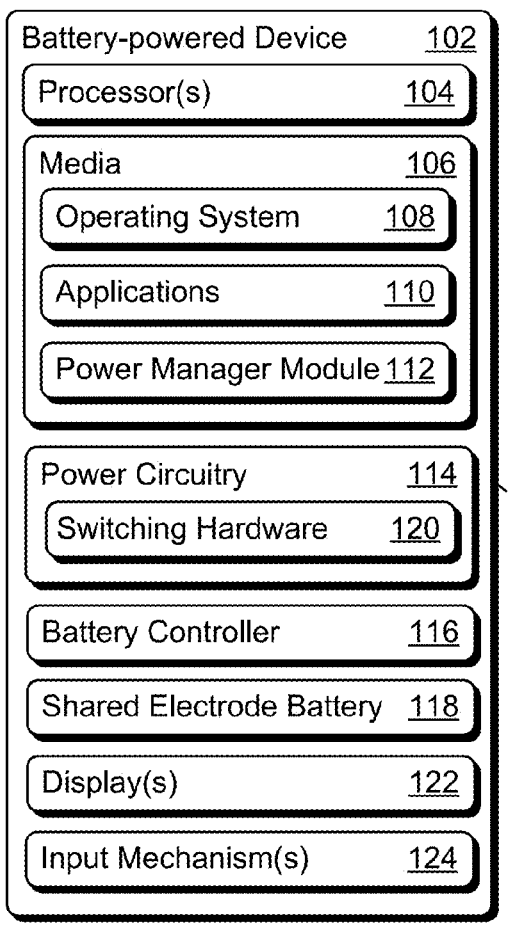
FIG. 1 illustrates an example environment for implementing a shared electrode battery.
Figure 1:
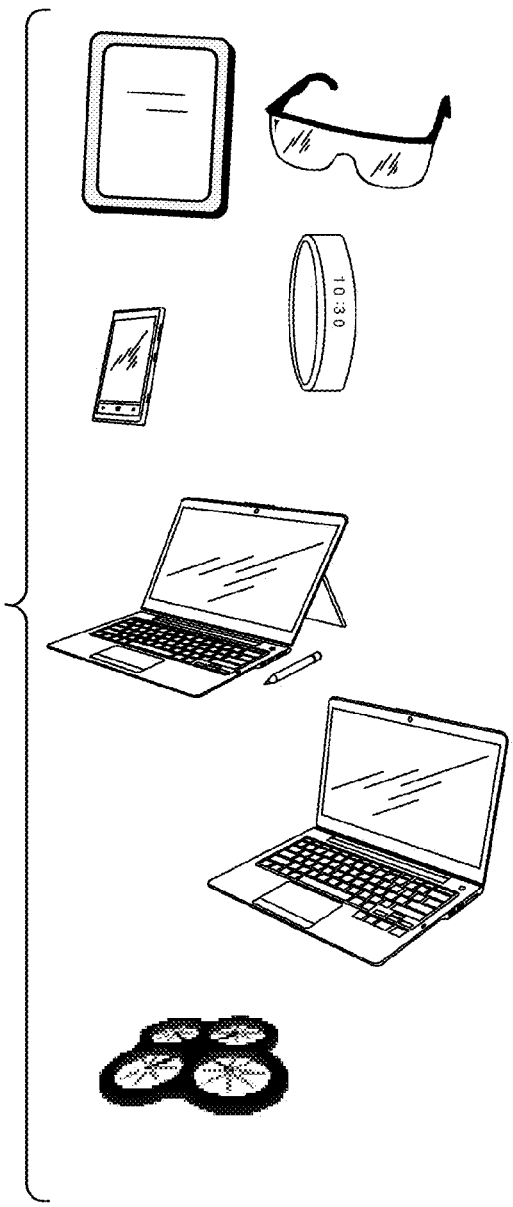

Techniques for a shared electrode battery are discussed herein. Generally, different battery configurations are described that include multiple electrodes of one type (e.g., cathodes) that share an electrode of another type (e.g., a shared anode).

For instance, one or more implementations utilize multiple cathodes and a shared anode. The different cathodes have different characteristics, such as different chemistries, particle sizes and distributions, capacities, and so forth that are designed to provide particular features such as high energy density, high power density, high cycle life, fast charge, safety, and so forth. Multiple cathode-anode pairings are possible in which the battery provides power. For example, if the battery includes two cathodes and a shared anode, one cathode-anode pairing is the first cathode and the shared anode, and another cathode-anode pairing is the second cathode and the shared anode. Switching hardware is operable to select one of the multiple cathode-anode pairings at any given time, allowing the battery to provide power by using the cathode having the desired characteristics at that given time. A single battery is thus able to provide these multiple different features.

Additionally or alternatively, one or more implementations utilize multiple anodes and a shared cathode. The different anodes have different characteristics, such as different chemistries, particle sizes and distributions, capacities, and so forth that are designed to provide particular features such as high energy density, high power density, high cycle life, fast charge, safety, and so forth. Multiple cathode-anode pairings are possible in which the battery provides power. For example, if the battery includes two anodes and a shared cathode, one cathode-anode pairing is the first anode and the shared cathode, and another cathode-anode pairing is the second anode and the shared cathode. Switching hardware is operable to select one of the multiple cathode-anode pairings at any given time, allowing the battery to provide power by using the anode having the desired characteristics at that given time. A single battery is thus able to provide these multiple different features.

Using the techniques discussed herein, a device developer or manufacturer need not be limited to picking and choosing a particular combination of features for a battery, but is able to use a single battery (a single electrochemical cell) that provides multiple different combinations of features. A single battery thus provides the features of multiple different batteries. Furthermore, the characteristics of particular cathodes or anodes need not be changed due to blending of the cathode materials or the anode materials. For example, rather than averaging or combining the characteristics of two different cathode materials in a single cathode, two different cathodes having two different cathode materials can be included in a single electrochemical cell.

In the following discussion, an example environment is first described that is operable to employ techniques described herein. Next, a section entitled "Example Shared Electrode Batteries" describes some example batteries in accordance with one or more implementations. Following this, a section entitled "Shared Electrode Battery Control" describes some example details regarding control of a shared electrode battery in accordance with one or more embodiments. Next, a section entitled "Example Procedure" describes an example procedure for implementing a shared electrode battery in accordance with one or more embodiments. Finally, a section entitled "Example System and Device" describes an example system and device that are operable to employ techniques discussed herein in accordance with one or more embodiments.

Example Environment

FIG. 1 illustrates an example environment 100 for implementing a shared electrode battery. Environment 100 includes a battery-powered device 102, which may be implemented in various manners. The battery-powered device 102, for instance, may be configured as a traditional computer (e.g., a desktop personal computer, laptop computer, and so on), a mobile station, an entertainment appliance, a wireless phone, a tablet, a netbook, a wearable device, a drone, an electric vehicle or plane, and so forth as further described in relation to FIG. 9.

Thus, the battery-powered device 102 may range from a full resource device with substantial memory and processor resources (e.g., personal computers, game consoles) to a low-resource device with limited memory and/or processing resources, such as a traditional set-top box, hand-held game console, wearable device, smart appliance, "Internet of Things" (IoT) device, health monitoring and assistance device, personal navigation device, and so forth. The battery-powered device 102 also relates to software that causes the battery-powered device 102 to perform various operations. Further, while implementations are discussed herein with reference to battery-powered device 102 being a computing device, it is to be appreciated that techniques discussed herein may be utilized in any apparatus that utilizes batteries, such as a medical device, a vehicle (e.g., an electronic automobile or motorcycle), a robotic machine, a toy, and so forth. The battery-powered device 102, for instance, may represent an internal controller of an apparatus.

Battery-powered device 102 optionally includes computer processor(s) 104 and computer-readable storage media 106 (media 106). Media 106 includes an operating system 108, applications 110, and a power manager module (hereinafter "power manager") 112.

Battery-powered device 102 also includes power circuitry 114, a battery controller 116, and a shared electrode battery 118. According to various implementations, the shared electrode battery 118 represents a battery (an electrochemical cell) from which the battery-powered device 102 draws power to operate, and which is rechargeable to replenish power within the shared electrode battery 118. Generally, power circuitry 114 represents functionality to enable the battery-powered device 102 to draw operating power from the shared electrode battery 118 or to apply charging power to the shared electrode battery 118. The power circuitry 114 also includes switching hardware 120, which allows activation of particular cathode-anode pairings.

The shared electrode battery 118 can be implemented using any of a variety of different form factors. For example, the shared electrode battery 118 may be implemented in a polymer (also referred to as pouch) form factor, a prismatic form factor, or a cylindrical form factor. However, it should be noted that these are only examples of form factors for the shared electrode battery 118, and that the shared electrode battery 118 can have any form factor. Regardless of the form factor, the shared electrode battery 118 is a single electrochemical cell.

Although a single shared electrode battery 118 is illustrated, it is to be appreciated that battery-powered device 102 may include any suitable number of batteries that may be implemented according to a variety of different types and form factors. Battery-powered device 102 can include one or more shared electrode batteries 118, and optionally one or more other types of batteries (types of batteries other than shared electrode batteries). Implementations and uses of the power circuitry 114 and the shared electrode battery 118 vary and are described in greater detail below.

The battery controller 116 is representative of functionality to activate different cathode-anode pairings for the shared electrode battery 118. Different cathode-anode pairings can be activated, although in one or more embodiments only one cathode-anode pairing is activated at any given time. For instance, the battery controller 116 is configured to activate a particular cathode-anode pairing by opening and closing appropriate switches of the switching hardware 120 based on an indication from the power manager 112 of which cathode-anode pairing is to be activated. Activation of a cathode-anode pairing refers to configuring a circuit (e.g., by opening and/or closing switches) so that power can be drawn from the activated cathode-anode pairing and/or charge provided to the activated cathode-anode pairing.

The power manager 112 is representative of functionality to enable various operational parameters of the shared electrode battery 118 to be controlled. For instance, the power manager 112 may interface with the battery controller 116 to select a cathode-anode pairing for the shared electrode battery 118, or alternatively with the power circuitry 114 and/or directly with the shared electrode battery 118 to select a cathode-anode pairing for the shared electrode battery 118. The power manager 112 may be implemented as instructions stored on the media 106 that are executed by the processor(s) 104. Additionally or alternatively, the power manager 112 may be implemented as other controllers or hardware components rather than as instructions that are executed by the processor(s) 104.

Battery-powered device 102 also optionally includes one or more displays 122 and input mechanisms 124. The displays 122 are generally representative of hardware and logic for visual output. The input mechanisms 124 may include gesture-sensitive sensors and devices, such as touch-based sensors and movement-tracking sensors (e.g., camera-based), as well as mice (free-standing or integral with a keyboard), a stylus, touch pads, accelerometers, and microphones with accompanying voice recognition software, to name a few. The input mechanisms 124 may be separate or integral with displays 122; integral examples including gesture-sensitive displays with integrated touch-sensitive or motion-sensitive sensors.

The operating system 108 manages resources of battery-powered device 102 and may be implemented using any suitable instruction format. For instance, the operating system 108 generally enables functionalities of the battery-powered device 102 to access hardware and logic resources of battery-powered device 102. Although the power manager 112 is illustrated separately from the operating system 108, it is to be appreciated that in at least some implementations, functionality of the power manager 112 may be implemented as part of the operating system 108.

The applications 110 include any suitable type of application and/or service, such as productivity applications, web browsers, media viewers, navigation applications, multimedia editing applications, and so forth. According to various implementations, the applications 110 may be implemented as locally-installed code that is executed as part of a local runtime environment. Additionally or alternatively, the applications 110 represent portals to distributed functionality, such as web services, cloud services, distributed enterprise services, and so forth.

Having discussed an example environment in which a shared electrode battery may be employed, consider now some example shared electrode batteries in accordance with one or more implementations.

Example Shared Electrode Batteries

This section describes some example shared electrode batteries in accordance with one or more implementations. The example shared electrode batteries, for instance, represent different example implementations of the shared electrode battery 118. The illustrations of the example shared electrode batteries are simplified for ease of understanding, and it is to be appreciated that the example shared electrode batteries can be implemented according to a wide variety of different configurations and form factors within the spirit and scope of the claimed implementations.

Figure 2:
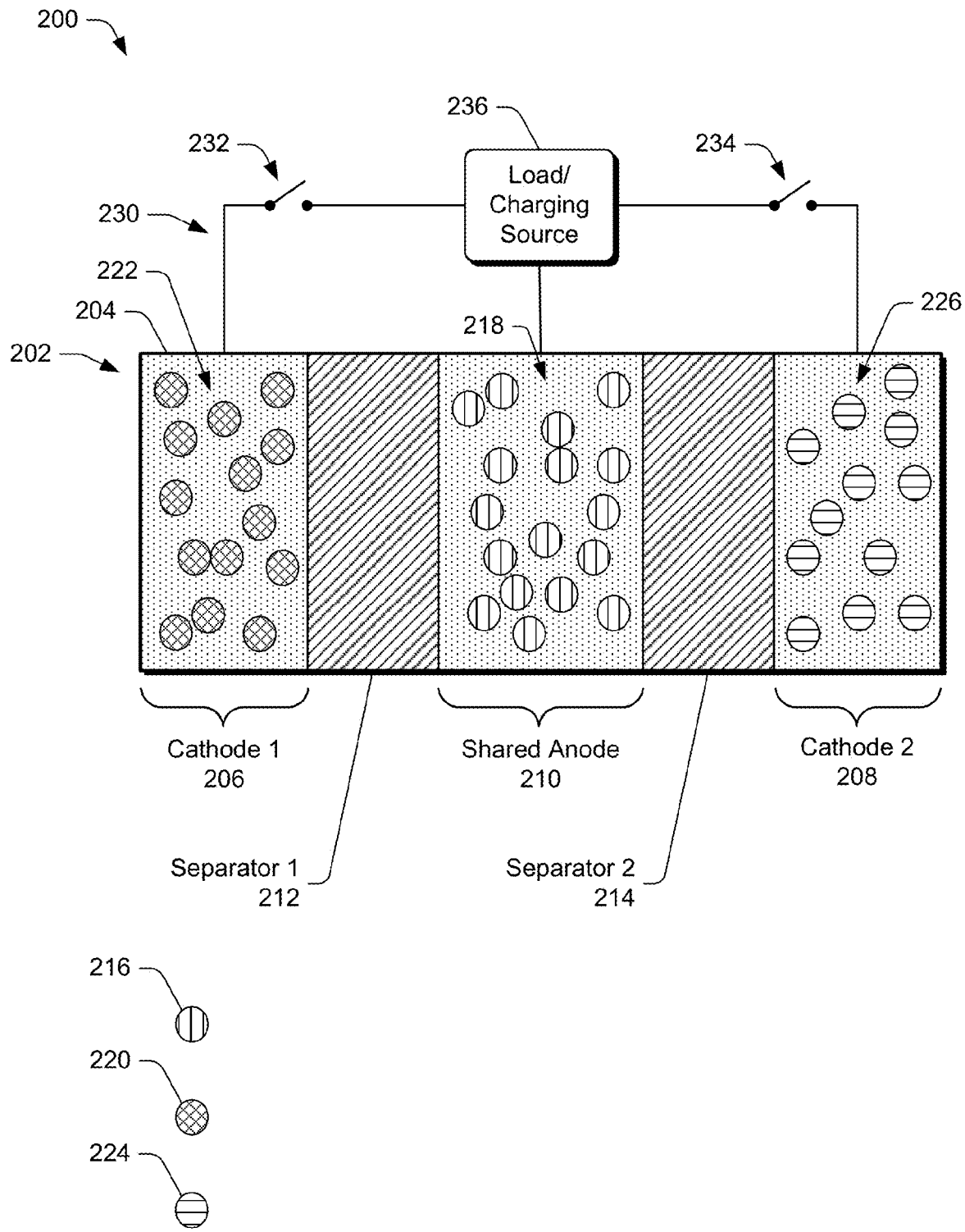
FIGS. 2, 3, 4, 5, 6, and 7 each illustrate an example implementation scenario of a shared electrode battery in accordance with one or more embodiments.

FIG. 2 illustrates an example implementation scenario 200 of a shared electrode battery in accordance with one or more embodiments. The scenario 200 shows a side cross-section of an example shared electrode battery 202 in accordance with one or more implementations. The shared electrode battery 202 includes a housing 204 that represents an external wrapper of the shared electrode battery 202 that serves to contain internal components of the shared electrode battery 202.

The internal components of the shared electrode battery 202 include multiple electrodes: a first cathode 206, a second cathode 208, and a shared anode 210. The internal components of the shared electrode battery 202 further include a first separator 212 and a second separator 214. The shared anode 210 includes anode material 216 and an electrolyte 218, the cathode 206 includes cathode material 220 and an electrolyte 222, and the cathode 208 includes cathode material 224 and an electrolyte 226. The electrolytes 218, 222, and 226 can be the same electrolyte and/or different types of electrolytes.

Positive ions impregnate the shared anode 210 during charging of the shared electrode battery 202, and the positive ions migrate back to the cathode 206 or 208 during discharging of the shared electrode battery 202. Generally, the separator 212 represents a physical divider that allows ions to flow between the first cathode 206 and the shared anode 210, but prevents mixing of the anode material 216 and electrolyte 218 in the shared anode 210 with the cathode material 220 and electrolyte 222 in the first cathode 206.

Similarly, the separator 214 represents a physical divider that allows ions to flow between the second cathode 208 and the shared anode 210, but prevents mixing of the anode material 216 and electrolyte 218 in the shared anode 210 with the cathode material 224 and electrolyte 226 in the second cathode 208. In one or more embodiments, the separators 212 and 214 are also immersed in an electrolyte, which can be the same electrolyte and/or different type of electrolyte than the electrolytes 218, 222, and/or 226.

The first cathode 206 and the second cathode 208 have different characteristics, such as different chemistries, particle sizes and distributions, capacities, and so forth. These different characteristics can be a result of, in the two cathodes 206 and 208: using different cathode materials 220, 224 but the same electrolytes 222, 226; using different electrolytes 222, 226 but the same cathode materials 220, 224; or using different cathode materials 220, 224 and different electrolytes 222, 226.

According to various implementations, the electrolyte 222, the electrolyte 226, and the electrolyte 218 can be the same electrolyte, or multiple different types of electrolytes. Any of a variety of different electrolytes can be used as the electrolyte 222, the electrolyte 226, and the electrolyte 228, such as a liquid crystal solution.

Example materials that may be used to form the cathode material 220 and/or 224 include lithium compounds (e.g., lithium cobalt oxide, lithium manganese oxide, lithium nickel manganese cobalt oxide, lithium nickel manganese cobalt oxide), titanium compounds (e.g., titanium dioxide), lithium iron phosphate, nickel, and so forth. Example materials that may be used to form the anode material 216 include graphite, silicon, silicon alloys, sulfur, lithium alloys (e.g., lithium titanate), and so forth.

The cathode materials 220 and 224 can be the same or similar cathode materials, and the electrolytes 222 and 226 can be different. Similarly, other characteristics of the first cathode 206 and the second cathode 208 can be the same or similar, such as the same or similar particle sizes, the same or similar particle distributions, and so forth. Alternatively, the cathode materials (or other characteristics of the first cathode 206 and the second cathode 208 such as particle sizes and/or distributions) of the first cathode 206 and the second cathode 208 can be different, in which case the electrolytes 222 and 226 can be the same or different.

The shared electrode battery 200 is connected to a circuit 230 that includes a switch 232, a switch 234, and a load/charging source 236. The first cathode 206 and the second cathode 208 each has a tab or other connector (e.g., a positive tab) allowing the circuit 230 to be electrically coupled with the respective cathode. The shared anode 210 has a tab or other connector (e.g., a negative tab) allowing the circuit 230 to be electrically coupled with the shared anode 210. The switches 232 and 234 are included, for example, as part of the switching hardware 120 of FIG. 1. The circuit 230, for instance, represents a power supply line to power various components of the battery-powered device 102 including the load/charging source 236 powered by the shared electrode battery 202 and/or that provides charging power to the shared electrode battery 202. In the illustrated example of FIG. 2, both switches 232 and 234 are open. However, at any given time, one of the switches 232 and 234 can be closed.

Figure 3:
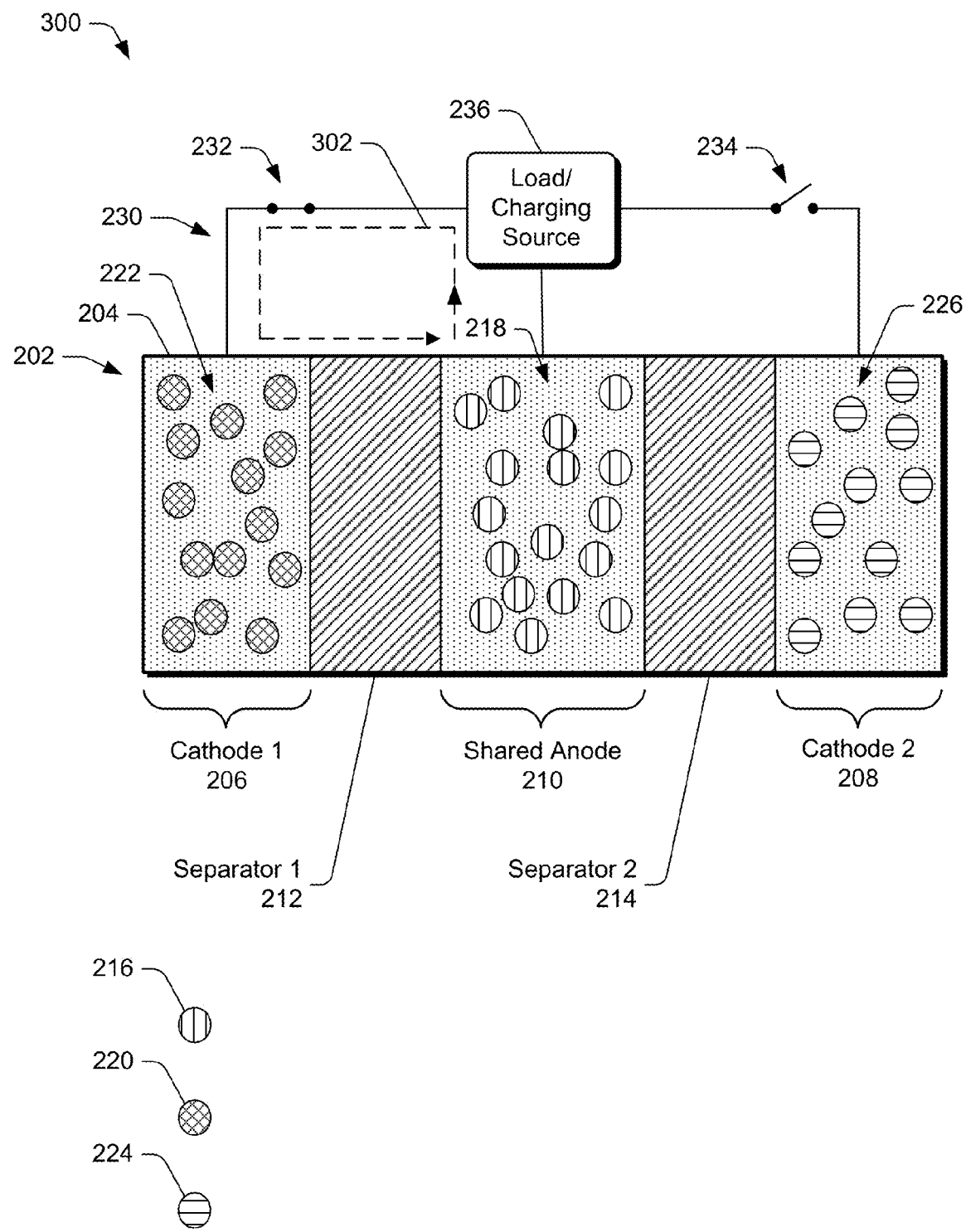

FIG. 3 illustrates an example implementation scenario 300 of a shared electrode battery in accordance with one or more embodiments. FIG. 3 illustrates the example implementation scenario 200 of FIG. 2 when the switch 232 is closed. When switch 232 is closed, switch 234 remains open. Thus, there is a current flow 302 across the circuit 230, the current flow 302 including the flow of ions between the cathode 206 and the shared anode 210 (but not between the cathode 208 and the shared anode 210). The current flow 302 may alternate between representing a load current that draws current from the shared electrode battery 202, and a charging current for charging the shared electrode battery 202.

Figure 4:
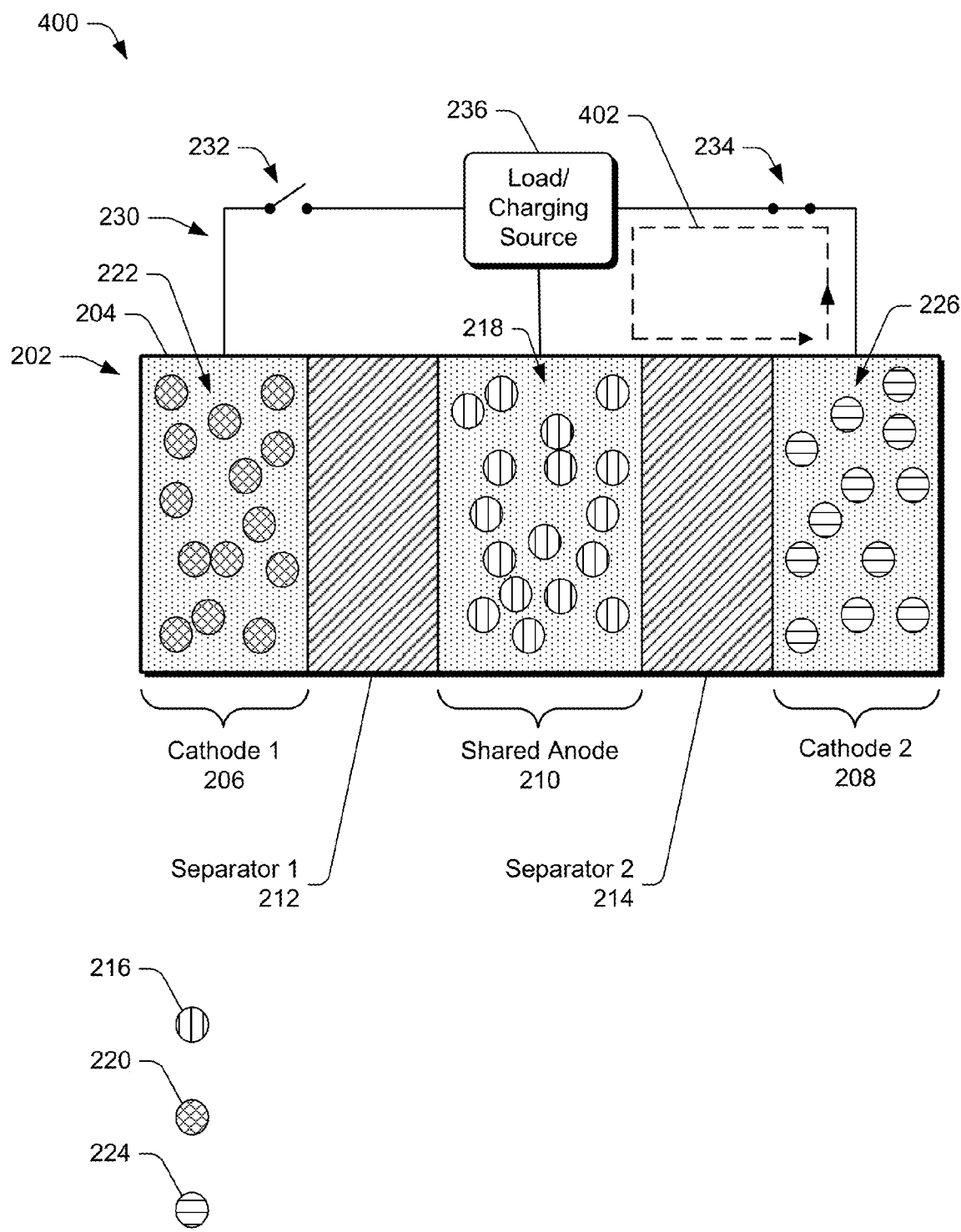

FIG. 4 illustrates an example implementation scenario 400 of a shared electrode battery in accordance with one or more embodiments. FIG. 4 illustrates the example implementation scenario 200 of FIG. 2 when the switch 234 is closed. When switch 234 is closed, switch 232 remains open. Thus, there is a current flow 402 across the circuit 230, the current flow 402 including the flow of ions between the cathode 208 and the shared anode 210 (but not between the cathode 206 and the shared anode 210). The current flow 402 may alternate between representing a load current that draws current from the shared electrode battery 202, and a charging current for charging the shared electrode battery 202.

Closing one of the switches 232 and 234 allows selective activation of one of multiple cathode-anode pairings: the pairing of the cathode 206 and the shared anode 210 as illustrated in FIG. 3, or the pairing of the cathode 208 and the shared anode 210 illustrated in FIG. 4. The cathodes 206 and 208 have different characteristics as discussed above, so the characteristics of the battery 202 will similarly change based on which cathode-anode pairing is being used. The battery 202 thus effectively provides, as a single battery (e.g., in a single housing 204), two different types of batteries each having different characteristics.

Figure 5:
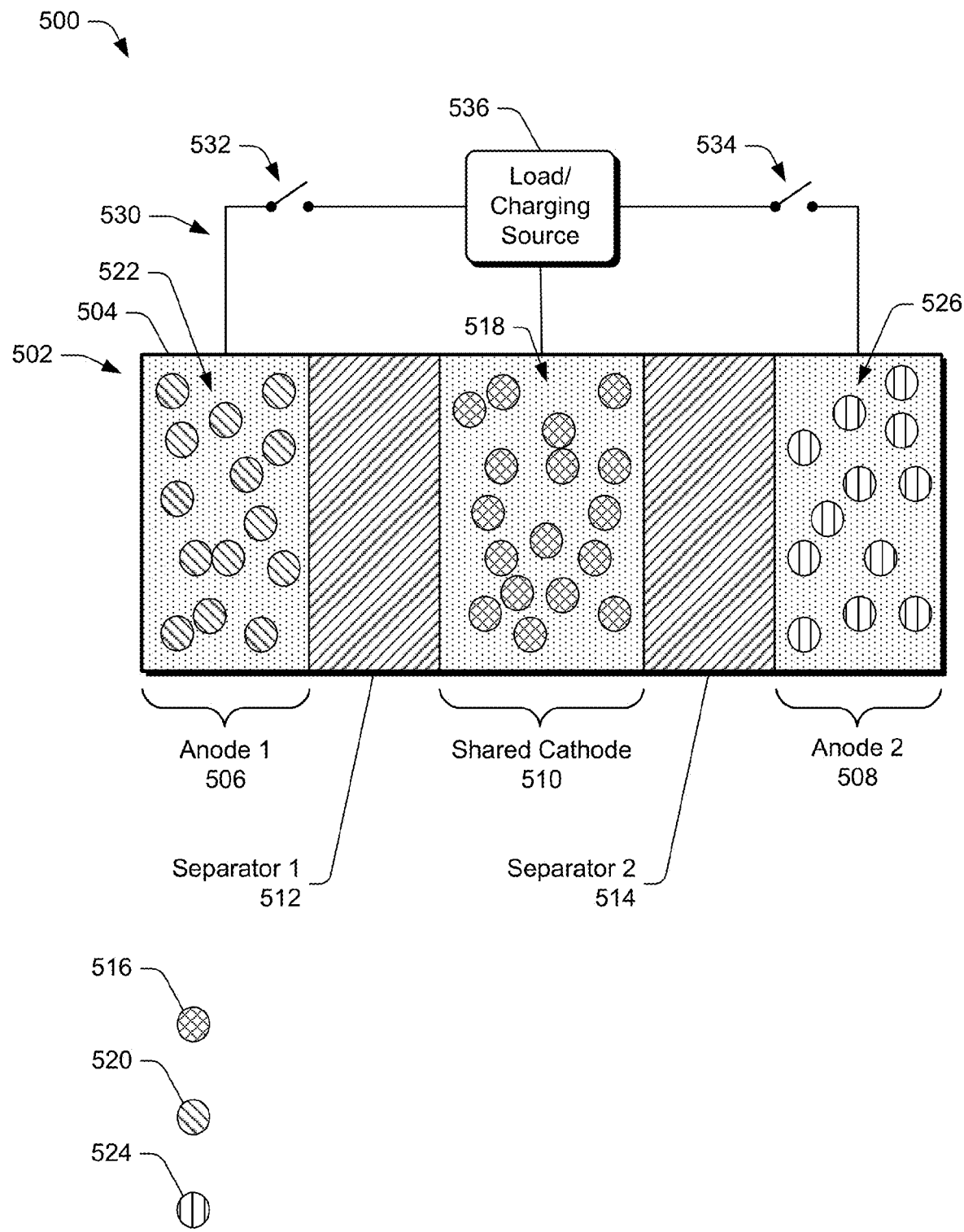

FIG. 5 illustrates an example implementation scenario 500 of a shared electrode battery in accordance with one or more embodiments. The example scenario 500 is similar to the example implementation scenario 200 of FIG. 2, although in the scenario 500 there is a shared cathode and multiple anodes (as opposed to a shared anode and multiple cathodes in the scenario 200). The scenario 500 shows a side cross-section of an example shared electrode battery 502 in accordance with one or more implementations. The shared electrode battery 502 includes a housing 504 that represents an external wrapper of the shared electrode battery 502 that serves to contain internal components of the shared electrode battery 502.

The internal components of the shared electrode battery 502 include multiple electrodes: a first anode 506, a second anode 508, and a shared cathode 510. The internal components of the shared electrode battery 502 further include a first separator 512 and a second separator 514. The shared cathode 510 includes cathode material 516 and an electrolyte 518, the anode 506 includes anode material 520 and an electrolyte 522, and the anode 508 includes anode material 524 and an electrolyte 526. The electrolytes 518, 522, and 526 can be the same electrolyte and/or different types of electrolytes.

The cathode material 516 in the shared cathode 510 is a material to which positive ions will migrate during discharging of the shared electrode battery 502, and the anode material 520 and 524 in each of the anodes 506 and 508, respectively, is a material to which positive ions will migrate during charging of the shared electrode battery 502. Generally, the separator 512 represents a physical divider that allows ions to flow between the first anode 506 and the shared cathode 510, but prevents mixing of the cathode material 516 and electrolyte 518 in the shared cathode 510 with the anode material 520 and electrolyte 522 in the first anode 506. Similarly, the separator 514 represents a physical divider that allows ions to flow between the second anode 508 and the shared cathode 510, but prevents mixing of the cathode material 516 and electrolyte 518 in the shared cathode 510 with the anode material 524 and electrolyte 526 in the second anode 508. In one or more embodiments, the separators 512 and 514 are also immersed in an electrolyte, which can be the same electrolyte and/or different type of electrolyte than the electrolytes 518, 522, and/or 526.

The first anode 506 and the second anode 508 have different characteristics, such as different chemistries, particle sizes and distributions, capacities, and so forth. These different characteristics can be a result of, in the two anodes 506 and 508: using different anode materials 520, 524 but the same electrolytes 522, 526; using different electrolytes 522, 526 but the same cathode materials 520, 524; or using different cathode materials 520, 524 and different electrolytes 522, 526.

According to various implementations, the electrolyte 522, the electrolyte 526, and the electrolyte 518 can be the same electrolyte, or multiple different types of electrolytes. Any of a variety of different electrolytes can be used as the electrolyte 522, the electrolyte 526, and the electrolyte 528, such as a liquid crystal solution.

Example materials that may be used to form the anode material 520 and/or 524 include graphite, silicon, silicon alloys, sulfur, lithium alloys, and so forth. Example materials that may be used to form the cathode material 516 include lithium compounds (e.g., lithium cobalt oxide), titanium compounds (e.g., titanium dioxide), lithium iron phosphate, nickel, and so forth.

The anode materials 520 and 524 can be the same or similar anode materials, and the electrolytes 522 and 526 can be different. Similarly, other characteristics of the first anode 506 and the second anode 508 can be the same or similar, such as the same or similar particle sizes, the same or similar particle distributions, and so forth. Alternatively, the anode materials (or other characteristics of the first anode 506 and the second anode 508 such as particle sizes and/or distributions) of the first anode 506 and the second anode 508 can be different, in which case the electrolytes 522 and 526 can be the same or different.

The shared electrode battery 500 is connected to a circuit 530 that includes a switch 532, a switch 534, and a load/charging source 536. The first anode 506 and the second anode 508 each has a tab or other connector (e.g., a negative tab) allowing the circuit 530 to be electrically coupled with the respective anode. The shared cathode 510 has a tab or other connector (e.g., a positive tab) allowing the circuit 530 to be electrically coupled with the shared cathode 510. The switches 532 and 534 are included, for example, as part of the switching hardware 120 of FIG. 1. The circuit 530, for instance, represents a power supply line to power various components of the battery-powered device 102 including the load/charging source 536 powered by the shared electrode battery 502 and/or that provides charging power to the shared electrode battery 502. In the illustrated example of FIG. 5, both switches 532 and 534 are open. However, at any given time, one of the switches 532 and 534 can be closed.

Figure 6:
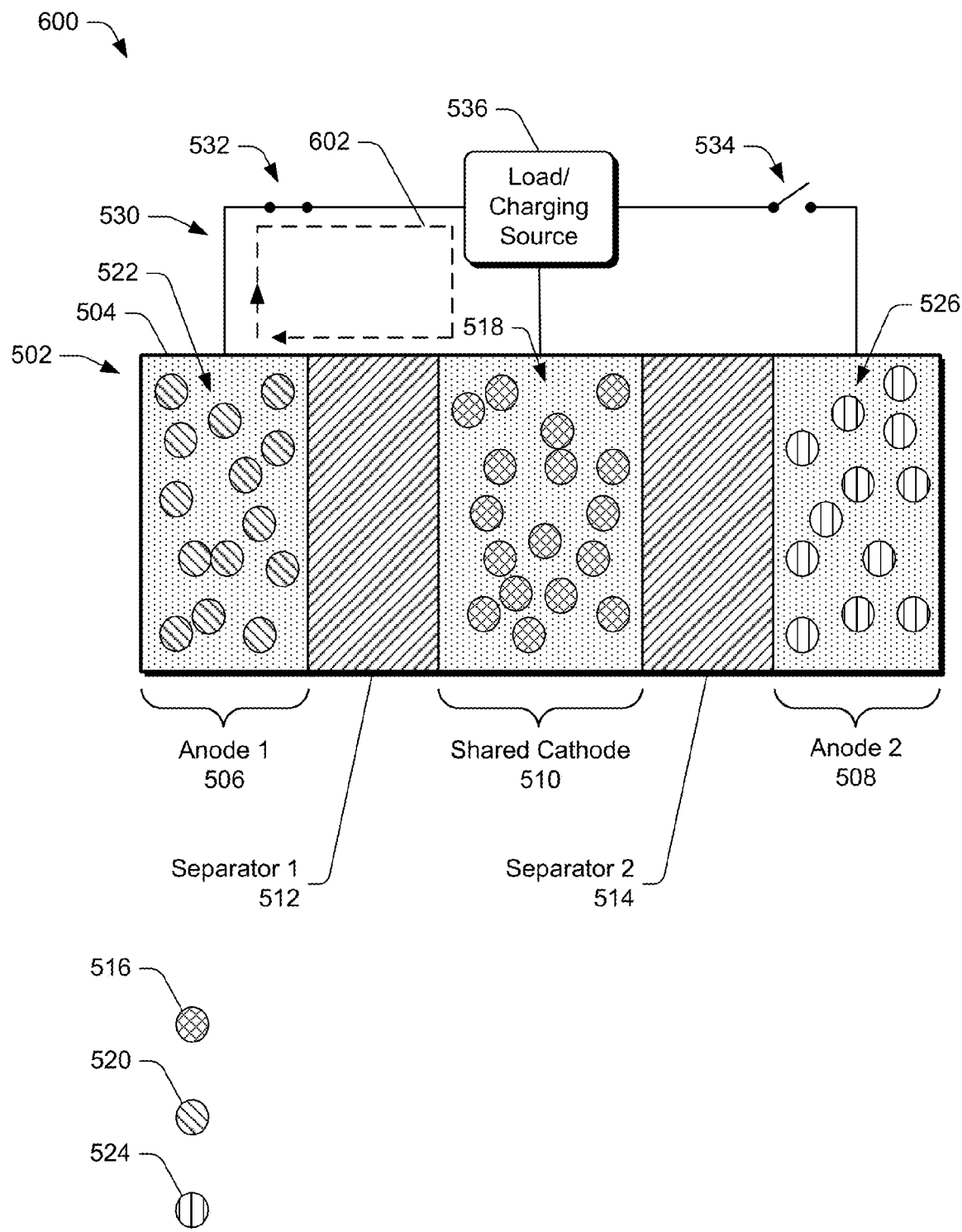

FIG. 6 illustrates an example implementation scenario 600 of a shared electrode battery in accordance with one or more embodiments. FIG. 6 illustrates the example implementation scenario 500 of FIG. 5 when the switch 532 is closed. When switch 532 is closed, switch 534 remains open. Thus, there is a current flow 602 across the circuit 530, the current flow 502 including the flow of ions between the anode 506 and the shared cathode 510 (but not between the anode 508 and the shared cathode 510). The current flow 602 may alternate between representing a load current that draws current from the shared electrode battery 502, and a charging current for charging the shared electrode battery 502.

Figure 7:
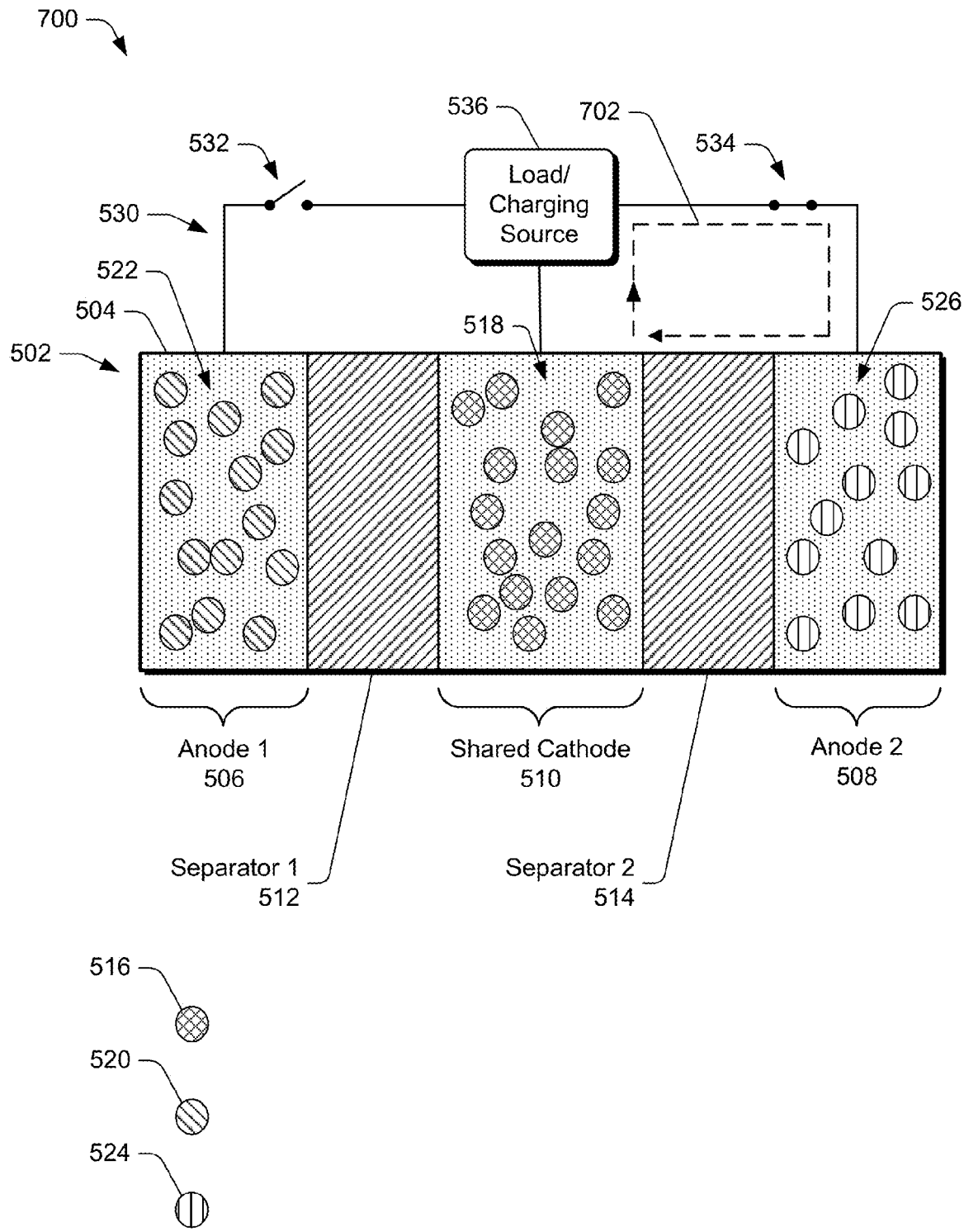

FIG. 7 illustrates an example implementation scenario 700 of a shared electrode battery in accordance with one or more embodiments. FIG. 7 illustrates the example implementation scenario 500 of FIG. 5 when the switch 534 is closed. When switch 534 is closed, switch 532 remains open. Thus, there is a current flow 702 across the circuit 530, the current flow 702 including the flow of ions between the anode 509 and the shared cathode 510 (but not between the anode 506 and the shared cathode 510). The current flow 702 may alternate between representing a load current that draws current from the shared electrode battery 502, and a charging current for charging the shared electrode battery 502.

Closing one of the switches 532 and 534 allows selective activation of one of multiple cathode-anode pairings: the pairing of the anode 506 and the shared cathode 510 as illustrated in FIG. 6, or the pairing of the anode 208 and the shared cathode 510 illustrated in FIG. 7. The anodes 506 and 508 have different characteristics as discussed above, so the characteristics of the battery 502 will similarly change based on which cathode-anode pairing is being used. The battery 502 thus effectively provides, as a single battery (e.g., in a single housing 504), two different types of batteries each having different characteristics.

In the example scenarios of FIGS. 2-7, shared electrode batteries having a shared electrode of one type and two electrodes of another type (e.g., a shared anode and two cathodes, or a shared cathode and two anodes) are discussed. However, it should be noted that a shared electrode battery can have a shared electrode of one type and three or more electrodes of another type. For example, a battery 202 of FIG. 2 may include a third cathode, a fourth cathode, and so forth, with additional separators between each of the cathodes and the shared anode 210. Each of these additional cathodes can have different characteristics than the other cathodes in the battery 202. For each cathode, the circuit 230 includes a switch (analogous to switches 232 and 234) allowing a cathode-anode pairing that includes that cathode and the shared anode 210.

By way of another example, a battery 502 of FIG. 5 may include a third anode, a fourth anode, and so forth, with additional separators between each of the anodes and the shared cathode 510. Each of these additional anodes can have different characteristics than the other anodes in the battery 502. For each anode, the circuit 530 includes a switch (analogous to switches 532 and 534) allowing a cathode-anode pairing that includes that anode and the shared cathode 510.

Furthermore, it should be noted that a shared electrode battery can include multiple anodes and multiple cathodes, with a circuit including at least one switch allowing any pairing (or a subset of all possible pairings) of one of the multiple anodes and one of the multiple cathodes to be activated. These different anodes and cathodes can have different characteristics, allowing a broad range of battery characteristics or features to be selected from a single battery simply by closing the appropriate switch. It should be further noted that such a shared electrode battery would also include one or more separators to function as a physical divider that allows ions to flow between each supported pairing of one of the multiple anodes and one of the multiple cathodes, but prevents mixing of the anode material and electrolyte in each of the anodes with the other anodes or cathodes, and prevents mixing of the cathode material and electrolyte in each of the cathodes with the other anodes or cathodes.

Shared Electrode Battery Control

This section describes some example details regarding control of a shared electrode battery. Generally, the control of a shared electrode battery refers to determining which of the multiple cathode-anode pairings is to be activated at any given time.

Referring again to FIG. 1, the power manager 112 is representative of functionality to enable various operational parameters of the shared electrode battery 118 to be controlled. In one or more embodiments, the power manager 112 interfaces with the battery controller 116 to select a cathode-anode pairing for the shared electrode battery 118, and the battery controller 116 is configured to activate a particular cathode-anode pairing by opening and closing the appropriate switches of the switching hardware 120.

The power manager 112 can select a cathode-anode pairing for the shared electrode battery 118 in any of a variety of different manners. As discussed above, the different cathodes (or anodes) have different characteristics, such as different chemistries, particle sizes and distributions, capacities, and so forth that are designed to provide particular features such as high energy density, high power density, high cycle life, fast charge, safety, and so forth. The power manager 112 can select which features are desirable at any given time, and select a cathode-anode pairing that provides those desired features.

In one or more embodiments, the power manager 112 implements a switching policy established based on power management considerations to control the shared electrode battery 118. Establishing the switching policy may involve analyzing factors including but not limited to characteristics of the electrodes of the shared electrode battery 118, charge levels/states of the electrodes of the shared electrode battery 118, power state of the battery-powered device 102, actual and expected workloads of the battery-powered device 102, thermal conditions of the battery-powered device 102, user presence at the battery-powered device 102, processor/core utilization of the battery-powered device 102, application context of the applications 110, device context of the battery-powered device 102, priority of various applications 110 or operations to be performed, contextual clues regarding the battery-powered device 102 or applications 110, and other suitable performance metrics that may be used to drive power management decisions at the battery-powered device 102 level. The switching policy may additionally or alternatively be established by analyzing factors including information regarding a user's future scheduled usage (e.g., according to the user's calendar) of the battery-powered device 102, a user's past usage of a battery-powered device (e.g., battery-powered device 102) to predict future workload patterns for the battery-powered device 102, temperatures or environments the shared electrode battery is expected to be in the future (e.g., according to the user's calendar, according to a navigation system of the battery-powered device 102), and so forth. The power manager 112 may be configured to apply the switching policy to select a particular cathode-anode pairing of the shared electrode battery 118 to activate based on the assessment of system-wide performance metrics, conditions, and/or data regarding the battery-powered device 102, which is also referred to herein as analyzing an operational context for the battery-powered device 102. The operational context for the battery-powered device 102 includes, for example, data regarding the various factors discussed above with reference to the switching policy.

For example, an operational context may be assessed based at least upon battery data that indicates the types of electrodes in the shared electrode battery 118, characteristics of the electrodes in the shared electrode battery 118, charge states of the electrodes in the shared electrode battery 118, and so forth. The operational context may also represent a device state that reflects factors including the power state of the battery-powered device 102, actual and expected workloads of the battery-powered device 102, load current requirements of the battery-powered device 102, thermal conditions of the battery-powered device 102, user presence at the battery-powered device 102, processor/core utilization of the battery-powered device 102, application context of the applications 110, and/or other performance parameters. A cathode-anode pairing for the shared electrode battery 118 may be selected and set based upon an operational context that is recognized through analysis of the battery data and other contextual factors and/or performance parameters for the battery-powered device 102 that are tracked via the power manger 112.

The switching policy specifies cathode-anode pairings to utilize for different operational contexts. In other words, the switching policy is designed to match cathode-anode pairings to different operational contexts. When an operational context is recognized, the switching policy is used to select a cathode-anode pairing that matches the context from among multiple cathode-anode pairings supported by the shared electrode battery 118. Then, an appropriate one or more switches of the switching hardware 120 are opened (or kept open if already open), and an appropriate one or more switches of the switching hardware 120 are closed (or kept closed if already closed) to activate the selected cathode-anode pairing. In this way, the power manger 112 implements the switching policy to make determinations regarding which cathode-anode pairings to use to draw power from the shared electrode battery 118, how much power to draw from the shared electrode battery 118 for a given cathode-anode pairing, and when to make switches between different cathode-anode pairing for drawing power from the shared electrode battery 118. Similarly, the power manger 112 implements the switching policy to make determinations regarding which cathode-anode pairings to use to charge the shared electrode battery 118, how much to charge the shared electrode battery 118 for a given cathode-anode pairing, and when to make switches between different cathode-anode pairings for charging the shared electrode battery 118.

By switching between different cathode-anode pairings in the manner described herein, the cathode-anode pairing utilized for a given time period may be tailored to tasks performed during the time period. Depending upon load requirements and other factors, power and battery life may be conserved in scenarios that can tolerate power throttling and the shared electrode battery 118 may be managed to achieve a high level of performance in other "priority" scenarios that demand low latency and/or substantial power. As such, a balance can be achieved between efficient use of power, latency, and battery life by selectively switching between cathode-anode pairings using the techniques discussed herein. For example, relatively small and efficient electrodes may be utilized to service loads for operational context that are associated with low priority tasks and load requirements. On the other hand, larger capacity electrodes may be activated for ongoing or expected tasks that are assigned high priority and/or are associated with relatively high load requirements. By way of another example, if a user is expected to attend a video conference call later in the day (e.g., due to the video conference call being on the user's calendar), then energy in a cathode-anode pairing that is better capable of handling such a workload (providing power during the video conference call) more efficiently is preserved so that the energy is available when the video conference call occurs. Accordingly, the shared electrode battery 118 having a diverse set of electrodes enables switching of the load current among the different cathode-anode pairings in various ways to accommodate different operational contexts and scenarios.

The battery controller 116 and switching hardware 120 may be configured to support multiple different modes of operation for shared electrode battery 118. In one mode, the switching hardware 120 is controlled to select one cathode-anode pairing at a time from which current is drawn to support the load (or to which current provided to support the charge). The particular cathode-anode pairing that is selected for a given time period is dependent upon the operational context and switching policy. For example, below a relatively low current threshold such as twenty milliamps, a first low power, high efficiency cathode-anode pairing may be selected via the switching hardware 120. Then, when the current threshold is exceeded (e.g., above twenty milliamps), the load may be switched to a second, higher performance cathode-anode pairing by directing the switching hardware 120. In this mode, switching occurs at a relatively low frequency such that the load is serviced (or charge is provided) using a single cathode-anode pairing at a time.

In another mode, the switching hardware 120 is controlled to cycle rapidly between two or more different cathode-anode pairings to draw a percentage of the overall load current from (or provide a percentage of the overall charge current to) each cathode-anode pairing. In other words, the switching hardware 120 is cycled at a relatively high frequency to pull current from (or provide current to) different cathode-anode pairings according to weighting assigned to each cathode-anode pairing by the switching policy. Effectively, the rapid cycling in this mode enables servicing of the load by drawing different portions of load current from different cathode-anode pairings at the same time (or providing different portions of the charge current to different cathode-anode pairings at the same time). For example, for a shared electrode battery 118 having two cathode-anode pairings, forty percent of the load may be drawn from a first cathode-anode pairing and sixty percent from a second cathode-anode pairing.

In yet another mode, the switching hardware 120 is controlled to cycle rapidly between two or more different cathode-anode pairings to draw a specified amount of current at substantially the same time (e.g., simultaneously) from two or more cathode-anode pairings being used to support the load (or to provide a specified amount of current at substantially the same time from to two or more cathode-anode pairings). In this mode, the amount of current supplied by (or provided to) each cathode-anode pairing is designated as opposed to setting percentages or weight factors. Again, rapid cycling in this mode enables servicing of the load by drawing (or charging by providing) different portions of load current from (or charge current to) different cathode-anode pairings at effectively the same time, but in this case within constraints for the amount of current that is supplied from each cathode-anode pairing. By way of example and not limitation, current up to a designated amount (e.g., ten milliamps) may be supplied by a first cathode-anode pairing. Thereafter, an additional designated amount of current above the designated amount can be supplied by a second cathode-anode pairing (e.g., the next twenty milliamps over ten milliamps). Additional load current above and beyond the first two amounts (e.g., above thirty milliamps) can be supplied by a third cathode-anode pairing.

In one or more embodiments, the switching policy implemented by the power manager 112 also factors in the use of a shared electrode in the multiple cathode-anode pairings. Thus, the activation of any given cathode-anode pairing affects (increases or decreases) the charge in the shared electrode, and this affect is factored into the switching policy (e.g., as a charge level or state for the electrodes). For example, in a shared electrode battery 118 with a shared anode and two cathodes, the charge in the shared anode is drained whenever current is drawn to support the load regardless of whether current is drawn using a cathode-anode pairing that includes the first of the two cathodes or the second of the two cathodes. The switching policy thus does not treat each cathode-anode pairing independently, but recognizes that the selection of one cathode-anode pairing will alter the charge of the shared electrode.

Example Procedure

This section describes an example procedure for implementing a shared electrode battery in accordance with one or more embodiments. The procedure is shown as a set of operations (or acts) performed, such as through one or more entities or modules, and is not necessarily limited to the order shown for performing the operation. The example procedure may be employed in the environment 100 of FIG. 1, the system 900 of FIG. 9, and/or any other suitable environment. According to one or more implementations, the procedure describes an example way for performing various aspects of the example implementation scenarios described above. In at least some implementations, steps described for the procedure are implemented automatically and independent of user interaction.

Figure 8:
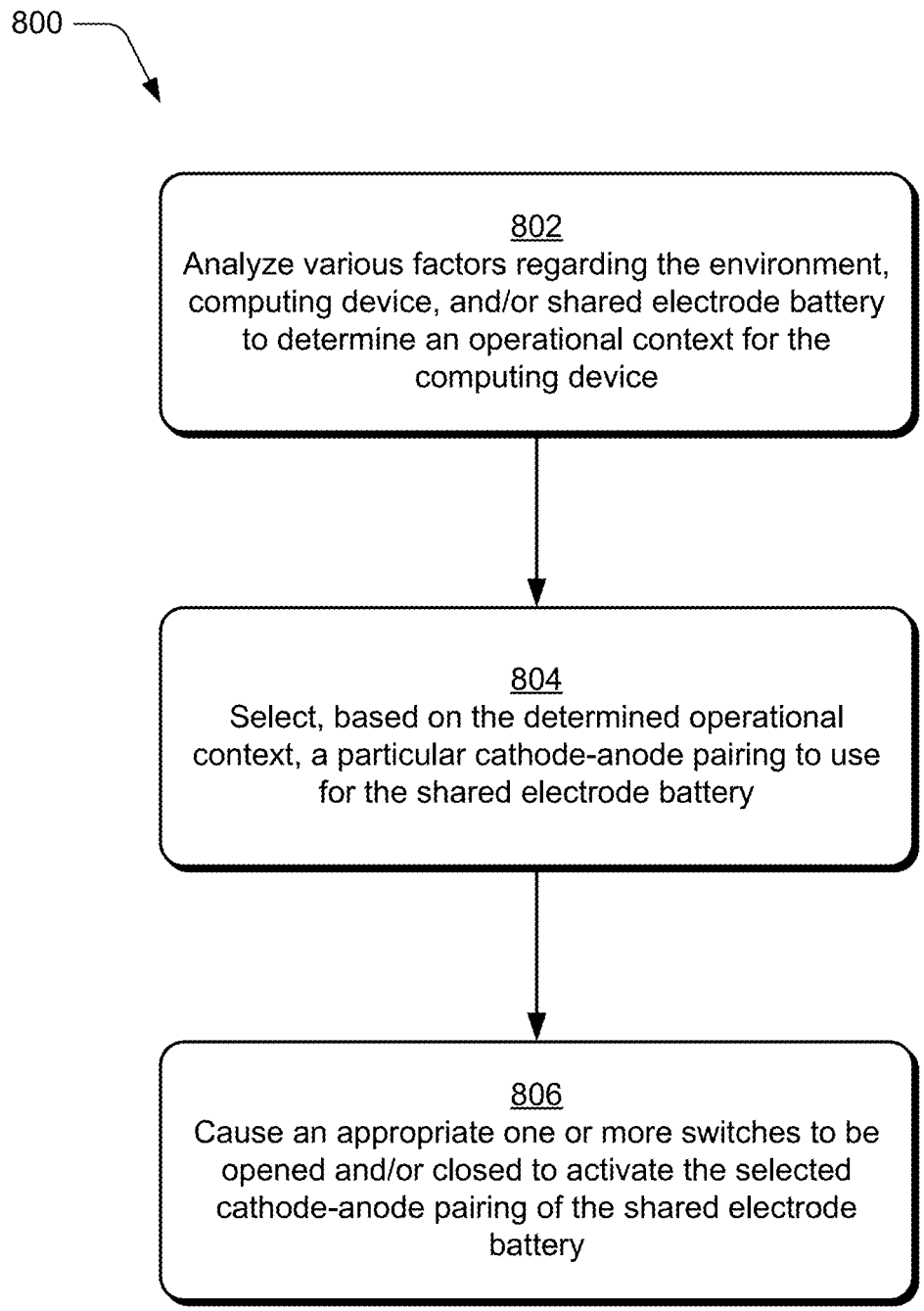
FIG. 8 is a flow diagram that describes acts in a method in accordance with one or more embodiments.

FIG. 8 is a flow diagram that describes acts in a method in accordance with one or more embodiments. The method, for instance, describes an example procedure for implementing a shared electrode battery in accordance with one or more embodiments.

In process 800, one or more factors are analyzed to determine an operational context for a battery-powered device including the shared electrode battery (act 802). Various different factors can be analyzed as discussed above, including factors regarding a battery-powered device that includes the shared electrode battery, factors regarding the environment in which the process 800 is implemented, factors regarding the shared electrode battery itself (e.g., characteristics of the electrodes of the shared electrode battery), and so forth. It should be noted that these factors can change over time, and thus the operational context can change over time.

A particular cathode-anode pairing is selected to use for the shared electrode battery based on the determined operational context (act 804). An established switching policy for the shared electrode battery is applied, based on the operational context determined in act 802, to select a cathode-anode pairing. The shared electrode battery supports multiple different cathode-anode pairings as discussed above, and different cathode-anode pairings can be selected at different times.

An appropriate one or more switches are opened and/or closed to activate the selected cathode-anode pairing of the shared electrode battery (act 806). As discussed above, various different switch combinations can allow the appropriate cathode-anode pairing to be selected and used to draw power from the shared electrode battery and/or charge the shared electrode battery. In act 806, the appropriate ones of these switches are opened and the appropriate ones of these switches are closed so that power can be drawn from (or provided to) the selected cathode-anode pairing.

Example System and Device

Figure 9:
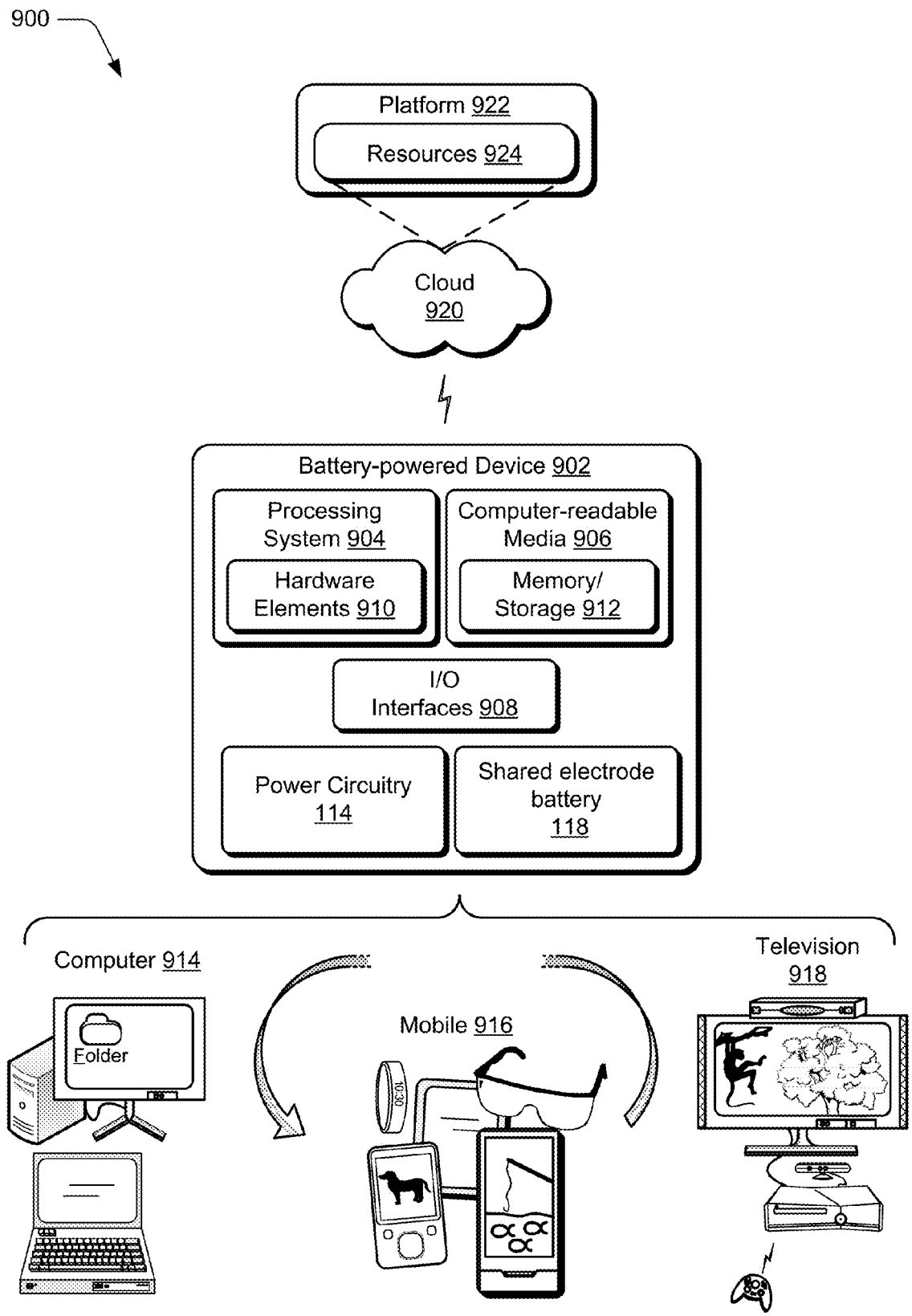
FIG. 9 illustrates an example system that includes an example computing device that is representative of one or more computing systems and/or devices that may implement various techniques described herein.

FIG. 9 illustrates an example system generally at 900 that includes an example battery-powered device 902 that is representative of one or more computing systems and/or devices that may implement various techniques described herein. For example, the battery-powered device 102 discussed above with reference to FIG. 1 can be embodied as the battery-powered device 902. The battery-powered device 902 may be, for example, a server of a service provider, a device associated with the client (e.g., a client device), an on-chip system, and/or any other suitable computing device or computing system.

The example battery-powered device 902 as illustrated includes a processing system 904, one or more computer-readable media 906, and one or more Input/Output (I/O) Interfaces 908 that are communicatively coupled, one to another. Although not shown, the battery-powered device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to battery-powered device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the battery-powered device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the battery-powered device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the battery-powered device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The battery-powered device 902 may be configured to implement particular instructions and/or functions corresponding to the software and/or hardware modules. Accordingly, implementation of modules that are executable by the battery-powered device 902 as software may be achieved at least partially in hardware, e.g., through use of computer-readable storage media and/or hardware elements 910 of the processing system. The instructions and/or functions may be executable/operable by one or more articles of manufacture (for example, one or more battery-powered devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the battery-powered device 902 may assume a variety of different configurations, such as for computer 914, mobile 916, and television 918 uses. Each of these configurations includes devices that may have generally different constructs and capabilities, and thus the battery-powered device 902 may be configured according to one or more of the different device classes. For instance, the battery-powered device 902 may be implemented as the computer 914 class of a device that includes a personal computer, desktop computer, a multi-screen computer, laptop computer, netbook, and so on.

The battery-powered device 902 may also be implemented as the mobile 916 class of device that includes mobile devices, such as a mobile phone, portable music player, portable gaming device, a tablet computer, a wearable device, a multi-screen computer, and so on. The battery-powered device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the battery-powered device 902 and are not limited to the specific examples of the techniques described herein. This is illustrated through inclusion of the power circuitry 114 and the shared electrode battery 118 on the battery-powered device 902. The power manager module 112, and other modules/applications, can be implemented in the memory/storage 912 or may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the battery-powered device 902. Resources 924 can also include services provided over the Internet and/or through a subscriber network, such as a cellular or Wi-Fi network.

The platform 922 may abstract resources and functions to connect the battery-powered device 902 with other devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the battery-powered device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and/or the system 900.

Example Embodiments

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system comprising: a battery including a shared anode, a first cathode, and a second cathode; and switching hardware operable to selectively activate one of multiple cathode-anode pairings, a first of the multiple cathode-anode pairings including the shared anode and the first cathode, and a second of the multiple cathode-anode pairings including the shared anode and the second cathode.

Alternatively or in addition to any of the above described systems, any one or combination of: the system further comprising one or more additional cathodes, the multiple cathode-anode pairings including, for each of the one or more additional cathodes, the shared anode and the additional cathode; the system further comprising a first separator situated between the first cathode and the shared anode to allow ions to flow between the first cathode and the shared anode but to prevent mixing of cathode material and electrolyte in the first cathode with anode material and electrolyte in the shared anode; the system further comprising a second separator situated between the second cathode and the shared anode to allow ions to flow between the second cathode and the shared anode but to prevent mixing of cathode material and electrolyte in the second cathode with anode material and electrolyte in the shared anode; the system comprising a computing device; only one of the multiple cathode-anode pairings being activated at any given time; the system further comprising a power manager configured to: analyze one or more factors regarding the system and/or the shared electrode battery to determine an operational context of the system, and select one of the multiple cathode-anode pairings to activate at a particular time based on the determined operational context; the battery comprising a single electrochemical cell having a prismatic or polymer form factor.

A shared electrode battery comprising: a first electrode of a first type; a second electrode of the first type; a third electrode of a second type, the third electrode comprising a shared electrode; a first separator between the first electrode and the third electrode to prevent mixing of electrode material of the first electrode with electrode material of the third electrode, but to allow ions to flow between the first electrode and the third electrode in response to activation of a cathode-anode pairing including the first electrode and the third electrode; and a second separator between the second electrode and the third electrode to prevent mixing of electrode material of the second electrode with electrode material of the third electrode, but to allow ions to flow between the second electrode and the third electrode in response to activation of a cathode-anode pairing including the second electrode and the third electrode.

Alternatively or in addition to any of the above described shared electrode batteries, any one or combination of: the first electrode of the first type comprising a cathode, the second electrode of the first type comprising a cathode, and the third electrode of the second type comprising an anode; the first electrode of the first type comprising an anode, the second electrode of the first type comprising an anode, and the third electrode of the second type comprising a cathode; the shared electrode battery further comprising: one or more additional electrodes of the first type, and one or more additional separators each to prevent mixing of electrode material of one of the one or more additional electrodes with electrode material of the third electrode, but to allow ions to flow between one of the additional electrodes and the third electrode in response to activation of a cathode-anode pairing including the one of the additional electrodes and the third electrode; the shared electrode battery further comprising: one or more additional electrodes of the second type, and one or more additional separators each to prevent mixing of electrode material of one of the one or more additional electrodes with electrode material of the first electrode, but to allow ions to flow between one of the additional electrodes and the first electrode in response to activation of a cathode-anode pairing including the one of the additional electrodes and the first electrode; only one of the multiple cathode-anode pairings being activated at any given time; the shared electrode battery comprising a single electrochemical cell having a prismatic or polymer form factor; the shared electrode battery further comprising: multiple electrodes of the first type, the multiple electrodes of the first type including the first electrode and the second electrode, multiple electrodes of the second type, the multiple electrodes of the second type including the third electrode, at least one of the multiple electrodes of the second type comprising a shared electrode that can be part of multiple cathode-anode pairings with at least two of the multiple electrodes of the first type, and at least one of the multiple electrodes of the first type comprising a shared electrode that can be part of the multiple cathode-anode pairings with at least two of the multiple electrodes of the second type, only one of the multiple cathode-anode pairings being activated at any given time.

A method comprising: analyzing one or more factors regarding a battery-powered device to determine an operational context for the battery-powered device, the battery-powered device including a shared electrode battery having a first electrode of a first type, a second electrode of the first type, and a third electrode of a second type, the third electrode comprising a shared electrode; selecting one of multiple cathode-anode pairings for the shared electrode battery to activate at a particular time based on the operational context; and causing at least one switch of a circuit to be closed to activate the selected cathode-anode pairing of the shared electrode battery, a first of the multiple cathode-anode pairings including the shared electrode and the first electrode, and a second of the multiple cathode-anode pairings including the shared electrode and the second electrode.

Alternatively or in addition to any of the above described methods, any one or combination of: the method further comprising causing at least one switch of the circuit to be opened so that only one of the multiple cathode-anode pairings is activated at any given time; the selecting comprising determining which of the multiple cathode-anode pairings provides a desired one or more features based on the one or more factors; the selecting further comprising applying a switching policy for the shared electrode battery, based on the operational context, to select one of the multiple cathode-anode pairings; the first electrode of the first type comprising a cathode, the second electrode of the first type comprising a cathode, and the third electrode of the second type comprising an anode.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a battery including a shared anode, a first cathode, and a second cathode;
    switching hardware operable to selectively activate one of multiple cathode-anode pairings, a first of the multiple cathode-anode pairings including the shared anode and the first cathode, and a second of the multiple cathode-anode pairings including the shared anode and the second cathode; and
    a power manager configured to analyze one or more factors regarding the system and/or the battery to determine an operational context of the system, and to select one of the multiple cathode-anode pairings to activate at a particular time based on the determined operational context.

2. A system as recited in claim 1, further comprising one or more additional cathodes, the multiple cathode-anode pairings including, for each of the one or more additional cathodes, the shared anode and the additional cathode.

3. A system as recited in claim 1, further comprising a first separator situated between the first cathode and the shared anode to allow ions to flow between the first cathode and the shared anode but to prevent mixing of cathode material and electrolyte in the first cathode with anode material and electrolyte in the shared anode.

4. A system as recited in claim 3, further comprising a second separator situated between the second cathode and the shared anode to allow ions to flow between the second cathode and the shared anode but to prevent mixing of cathode material and electrolyte in the second cathode with anode material and electrolyte in the shared anode.

5. A system as recited in claim 1, the system comprising a computing device.

6. A system as recited in claim 1, only one of the multiple cathode-anode pairings being activated at any given time.

7. A system as recited in claim 1, the battery comprising a single electrochemical cell having a prismatic form factor.

8. A device comprising:
    a shared electrode battery including:
        a first electrode of a first type;
        a second electrode of the first type;
        a third electrode of a second type, the third electrode comprising a shared electrode;
        a first separator between the first electrode and the third electrode to prevent mixing of electrode material of the first electrode with electrode material of the third electrode, but to allow ions to flow between the first electrode and the third electrode in response to activation of a cathode-anode pairing including the first electrode and the third electrode; and
        a second separator between the second electrode and the third electrode to prevent mixing of electrode material of the second electrode with electrode material of the third electrode, but to allow ions to flow between the second electrode and the third electrode in response to activation of a cathode-anode pairing including the second electrode and the third electrode; and
    a power manager configured to analyze one or more factors regarding the device and/or the shared electrode battery to determine an operational context of the device, and to select to activate, at a particular time based on the determined operational context, either the cathode-anode pairing including the first electrode and the third electrode or the cathode-anode pairing including the second electrode and the third electrode.

9. A device as recited in claim 8, the first electrode of the first type comprising a cathode, the second electrode of the first type comprising a cathode, and the third electrode of the second type comprising an anode.

10. A device as recited in claim 8, the first electrode of the first type comprising an anode, the second electrode of the first type comprising an anode, and the third electrode of the second type comprising a cathode.

11. A device as recited in claim 8, further comprising:
one or more additional electrodes of the first type; and
one or more additional separators each to prevent mixing of electrode material of one of the one or more additional electrodes with electrode material of the third electrode, but to allow ions to flow between one of the additional electrodes and the third electrode in response to activation of a cathode-anode pairing including the one of the additional electrodes and the third electrode.

12. A device as recited in claim 8, further comprising:
one or more additional electrodes of the second type; and
one or more additional separators each to prevent mixing of electrode material of one of the one or more additional electrodes with electrode material of the first electrode, but to allow ions to flow between one of the additional electrodes and the first electrode in response to activation of a cathode-anode pairing including the one of the additional electrodes and the first electrode.

13. A device as recited in claim 8, only one of the multiple cathode-anode pairings being activated at any given time.

14. A device as recited in claim 8, further comprising:
multiple electrodes of the first type, the multiple electrodes of the first type including the first electrode and the second electrode;
multiple electrodes of the second type, the multiple electrodes of the second type including the third electrode;
at least one of the multiple electrodes of the second type comprising a shared electrode that can be part of multiple cathode-anode pairings with at least two of the multiple electrodes of the first type; and
at least one of the multiple electrodes of the first type comprising a shared electrode that can be part of the multiple cathode-anode pairings with at least two of the multiple electrodes of the second type, only one of the multiple cathode-anode pairings being activated at any given time.

15. A method comprising:
analyzing one or more factors regarding a battery-powered device to determine an operational context for the battery-powered device, the battery-powered device including a shared electrode battery having a first electrode of a first type, a second electrode of the first type, and a third electrode of a second type, the third electrode comprising a shared electrode;
selecting one of multiple cathode-anode pairings for the shared electrode battery to activate at a particular time based on the operational context; and
causing at least one switch of a circuit to be closed to activate the selected cathode-anode pairing of the shared electrode battery, a first of the multiple cathode-anode pairings including the shared electrode and the first electrode, and a second of the multiple cathode-anode pairings including the shared electrode and the second electrode.

16. A method as recited in claim 15, the method further comprising causing at least one switch of the circuit to be opened so that only one of the multiple cathode-anode pairings is activated at any given time.

17. A method as recited in claim 15, the selecting comprising determining which of the multiple cathode-anode pairings provides a desired one or more features based on the one or more factors.

18. A method as recited in claim 15, the selecting further comprising applying a switching policy for the shared electrode battery, based on the operational context, to select one of the multiple cathode-anode pairings.

19. A method as recited in claim 15, the first electrode of the first type comprising a cathode, the second electrode of the first type comprising a cathode, and the third electrode of the second type comprising an anode.

20. A system as recited in claim 1, the power manager being further configured to select one of the multiple cathode-anode pairings that provides a desired one or more features based on the one or more factors.

* * * * *